(12) United States Patent
Huang et al.

(10) Patent No.: US 12,262,247 B2
(45) Date of Patent: Mar. 25, 2025

(54) METHOD AND APPARATUS FOR DERIVING CELL REFERENCE LOCATION IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 252 days.

(21) Appl. No.: 17/866,288

(22) Filed: Jul. 15, 2022

(65) Prior Publication Data

US 2023/0037533 A1 Feb. 9, 2023

Related U.S. Application Data

(60) Provisional application No. 63/272,019, filed on Oct. 26, 2021, provisional application No. 63/228,893, filed on Aug. 3, 2021.

(51) Int. Cl.
*H04W 28/06* (2009.01)
*H04W 36/32* (2009.01)
*H04W 36/36* (2009.01)

(52) U.S. Cl.
CPC ......... *H04W 28/06* (2013.01); *H04W 36/322* (2023.05); *H04W 36/362* (2023.05)

(58) Field of Classification Search
None
See application file for complete search history.

(56) References Cited

U.S. PATENT DOCUMENTS

| 2021/0044670 A1* | 2/2021 | Fänge | H04L 67/01 |
| 2022/0065979 A1* | 3/2022 | Bao | G01S 5/0246 |
| 2024/0036150 A1* | 2/2024 | Fresia | H04W 4/50 |

FOREIGN PATENT DOCUMENTS

KR  1020200086623  7/2020

OTHER PUBLICATIONS

"Offline-106: [NTN] Idle mode issues"; 3GPP TSG-RAN WG2 Meeting #111; ZTE Corporation, Sanechips; Aug. 17-28, 2020; 14 pages.
Office Action to the corresponding Korean patent application rendered by the Korean Intellectual Property Office (KIPO) on Dec. 18, 2024, 9 pages (including English translation).

* cited by examiner

*Primary Examiner* — Angela Nguyen
(74) *Attorney, Agent, or Firm* — Skaar Ulbrich Macari, P.A.

(57) ABSTRACT

Methods, systems, and apparatuses are provided for deriving cell reference location in a wireless communication system. A method for a UE in the wireless communication system can comprise receiving information of a first reference location of a cell, receiving an assistance information associated with the cell, deriving and/or acquiring a second reference location of the cell based on at least the assistance information, and using the second reference location of the cell to evaluate a location-based event or measurement.

20 Claims, 8 Drawing Sheets

METHOD AND APPARATUS FOR DERIVING CELL REFERENCE LOCATION IN A WIRELESS COMMUNICATION SYSTEM

CROSS-REFERENCE TO RELATED APPLICATIONS

The present Application claims priority to and the benefit of U.S. Provisional Patent Application Ser. No. 63/228,893, filed Aug. 3, 2021, and U.S. Provisional Patent Application Ser. No. 63/272,019, filed Oct. 26, 2021; with each of the referenced applications and disclosures fully incorporated herein by reference.

FIELD

This disclosure generally relates to wireless communication networks and, more particularly, to a method and apparatus for deriving cell reference location in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for deriving cell reference location in a wireless communication system. In various embodiments, the information of cell reference location can be updated less frequently, and a User Equipment (UE) can acquire the information of cell reference location less frequently. In various other embodiments, the validity of satellite ephemeris and cell reference location can be well controlled by the UE with minimum/optimized signaling overhead.

In various embodiments, with this and other concepts, systems, and methods of the present invention, a method for a UE in a wireless communication system comprises receiving information of a first reference location of a cell, receiving an assistance information associated with the cell, deriving and/or acquiring a second reference location of the cell based on at least the assistance information, and using the second reference location of the cell to evaluate a location-based event or measurement.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-211256, "Solutions for NR to support non-terrestrial networks (NTN)"; [2] 3GPP TR 38.821 V16.1.0, "Solutions for NR to support non-terrestrial networks (NTN)"; [3] 3GPP TS 38.331 V16.5.0, "NR, RRC protocol specification"; [4]R2-2106541, "Stage 3 running RRC CR for NTN Rel-17"; [5] draft R2-2110710 V13, "Stage 3 running RRC CR for NTN Rel-17"; [6] RP-211774, "Status Report to TSG"; and [7] 3GPP TS 38.304 V17.0.0, "NR, UE procedures in Idle mode and RRC Inactive state". The standards and documents listed above are hereby expressly and fully incorporated herein by reference in their entirety.

Figure 1:
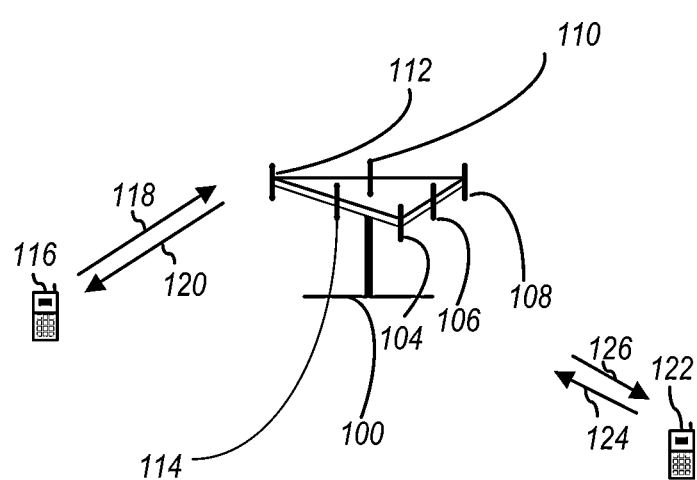
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
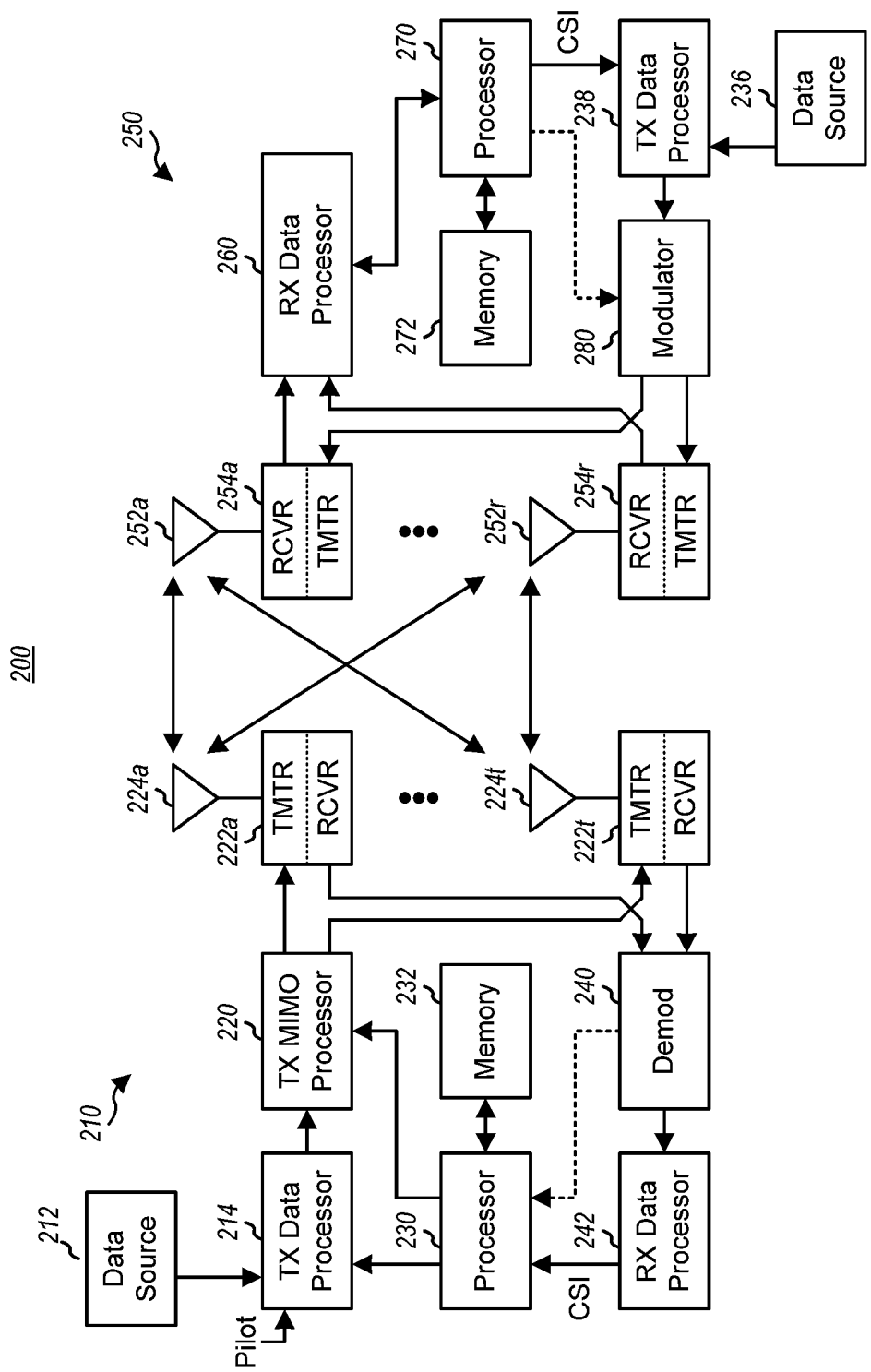
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
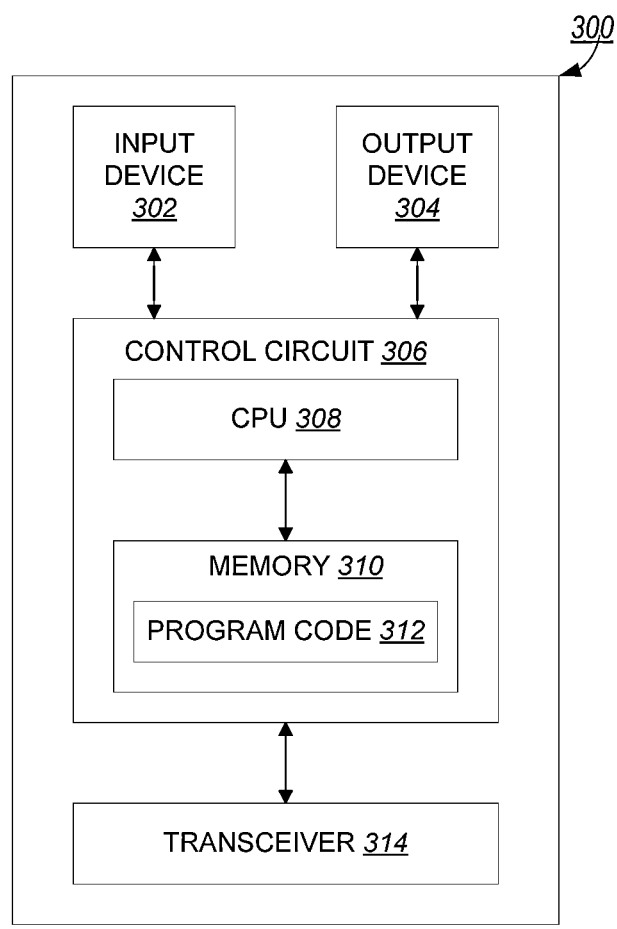
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
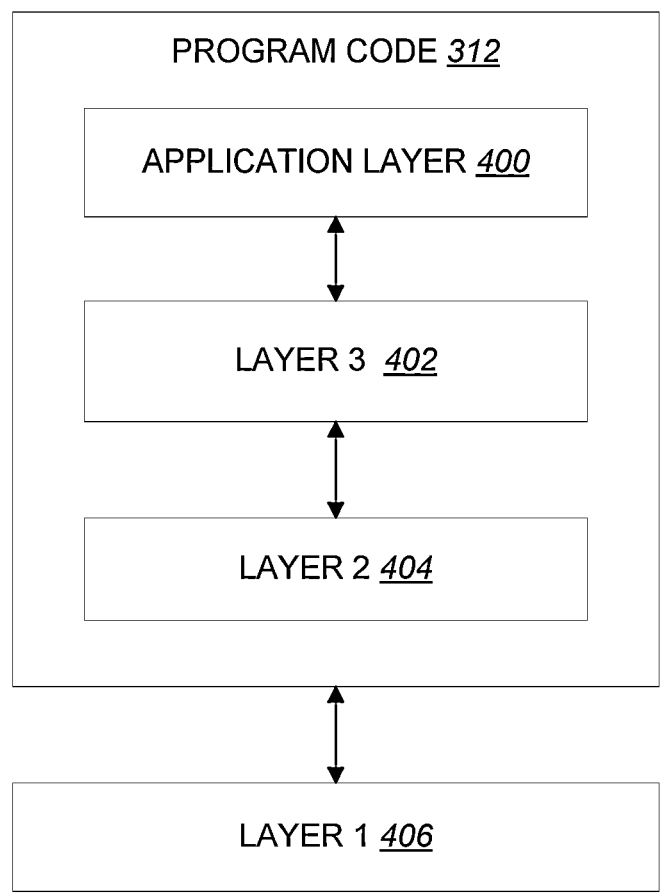
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

The work item of non-terrestrial networks (NTN) in NR has been approved in RAN plenary #91 meeting. The description of the work item is specified in [1] RP-211256:

\*\*\*\*\*\*\*\*\*\*\*\*\*\*\*\*\*\*\*\*\*\*\*\*\*\*\*\*\*\*\*\*\*\*\*\*\*\* Quotation Start \*\*\*\*\*\*\*\*\*\*\*\*\*\*\*\*\*\*\*\*\*\*\*\*\*\*\*\*\*\*\*\*\*\*\*\*\*\*

3  Justification

Non-terrestrial networks refer to networks, or segments of networks, using an airborne or spaceborne vehicle for transmission:

- Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites)

- Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

In 3GPP TS 22.261 approved at SA#82, use cases for 5G Satellite integration and the corresponding service requirements have been identified as result of the work item "5GSAT". This will address mobile broadband needs in unserved/underserved areas as well as public safety needs, maritime (3GPP TS 22.119 "Maritime communication services over 3GPP system") , airplane connectivity and railway communication service requirements applicable to satellite access.

Since RAN#76, two activities on NR to support Non-Terrestrial Networks have been successively carried out
- A first activity, FS_NR_nonterr_nw (see RP-171450) studied the channel model for the non-terrestrial networks, to define deployment scenarios, parameters and identify the key potential impacts on NR. The work led by RAN started at RAN#76 and has been completed at RAN#80. The results are reflected in TR 38.811.

- A second activity, FS_NR_NTN_solutions (see RP-190710), define and evaluate solutions for the identified key impacts from the first activity. The work led by RAN3 started at RAN#80 and is planned to be completed at RAN#86. The results are reflected in TR 38.821 (RP-193062).

Furthermore an email discussion took place between RAN#85 and #86 on the scoping of a Rel-17 WI on non-terrestrial network. The report of this email discussion is available in RP-192500. It concluded that the Rel-17 NR-NTN NWI should include two activities:
- Normative activity on NR-NTN to develop specifications to support the following scenarios:
    - Transparent payload based LEO scenario addressing at least 3GPP class 3 UE with and without GNSS capability and both Earth fixed &/or moving cell scenario (as per SI outcome).
        - *Note 1: Addressing LEO will provide the flexibility to also support transparent payload based HAPS based scenarios.*
    - Transparent payload based GEO scenario addressing UE with GNSS capability.
        - *Note 2: Addressing LEO and GEO scenarios will enable NR to support all NGSO scenarios with circular orbit at altitude greater than or equal to 600 km.*

- Study activity on NTN scenarios addressing
    - Transparent payload based HAPS scenarios: Study of enablers for Spectrum coexistence with cellular (additional Coresets, PCI confusion mitigation, ..)
    - IoT-NTN based scenarios
    - NTN-network based location of UE (for regulatory services): identify possible solutions Based on the above points, a new work item is proposed to carry the conclusion of the FS_NR_NTN_solutions study item and specify the solutions enabling NR to support non-terrestrial networks.

Addressing LEO and GEO scenarios will enable to support all NGSO scenarios with circular orbit at altitude greater than or equal to 600 km.

As per TR 38.821, it shall be assumed that handheld devices in FR1 and "VSAT" devices with external antenna (including fixed and moving platform mounted devices) can be considered for NTN for the RAN1-3 specifications.

In the context of this work item, HAPS refers to a high altitude platform system for which at least the service link (HAPS – UE) operates a 3GPP specified NR mobile service in allocated spectrum which regulation allows. If needed, the terminology "HAPS" may be revisited.
Note that HAPS, since they are defined as Airborne, the service link may use a different spectrum allocation as compared to satellites, which are defined as spaceborne.

4 Objective

4.1 Objective of SI or Core part WI or Testing part WI

The work item aims to specify the enhancements identified for NR NTN (non-terrestrial networks) especially LEO and GEO with implicit compatibility to support HAPS (high altitude platform station) and ATG (air to ground) scenarios according to the following principles:
- FDD is assumed for core specification work for NR-NTN.
    - NOTE: This does not imply that TDD cannot be used for relevant scenarios e.g. HAPS, ATG
- Earth fixed Tracking area is assumed with Earth fixed and moving cells
- UEs with GNSS capabilities are assumed.
- Transparent payload is assumed
- Handheld devices in FR1 are supported (e.g. Power class 3)

- "VSAT" devices with external antenna (including fixed and moving platform mounted devices) at least in FR2 are supported for the RAN1-3 specifications. "VSAT" characteristics in TR 38.821 can be assumed for the RAN1-3 specifications.

The detailed objectives are to specify enhancing features to Rel-15 & Rel-16's NR radio interface & NG-RAN as follows: [...]

The following control plane procedures enhancements should be specified (see TR 38.821)

- Idle mode:
  - Definition of additional assistance information for cell selection/reselection (e.g. using UE location information, satellite Ephemeris information)
  - Definition of NTN (satellite/HAPS) cell specific information in SIB
- Connected mode
  - Enhancement necessary to take into account location information (UE & Satellite/HAPS) and/or ephemeris in determining when to perform hand-over, in order to have a high degree of hand-over control for hand-over robustness and coverage management.
  - Enhancement to existing measurement configurations to address absolute propagation delay difference between satellites (e.g. SMTC measurement gap adaptation to the SSB/CSI-RS measurement window) [RAN2/4].
- Service continuity for mobility from TN to NTN and from NTN to TN systems (to be addressed when connected mode mobility has sufficiently progressed)
- Identify potential issues associated to the use of the existing Location Services (LCS) application protocols to locate UE in the context of NTN and specify adaptations if any [RAN2/3]

********************************** Quotation End **********************************

The NTN description is captured in TR 38.821 ([2] 3GPP TR 38.821 V16.1.0) as below:

********************************* Quotation Start *********************************

4.2 Non-Terrestrial Networks reference scenarios

[...]

Table 4.2-2: Reference scenario parameters

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth capability (service link) | 30 MHz for band < 6 GHz<br>1 GHz for band > 6 GHz | |
| [...] | | |
| Max Round Trip Delay (propagation delay only) | Scenario A: 541.46 ms (service and feeder links)<br>Scenario B: 270.73 ms (service link only) | Scenario C: (transparent payload: service and feeder links)<br>25.77 ms (600km)<br>41.77 ms (1200km)<br><br>Scenario D: (regenerative payload: service link only)<br>12.89 ms (600km)<br>20.89 ms (1200km) |
| Max differential delay within a cell (Note 6) | 10.3 ms | 3.12 ms and 3.18 ms for respectively 600km and 1200km |
| Max Doppler shift (earth fixed user equipment) | 0.93 ppm | 24 ppm (600km)<br>21ppm(1200km) |
| Max Doppler shift variation (earth fixed user equipment) | 0.000 045 ppm/s | 0.27ppm/s (600km)<br>0.13ppm/s(1200km) |
| User equipment motion on the earth | 1200 km/h (e.g. aircraft) | 500 km/h (e.g. high speed train)<br>Possibly 1200 km/h (e.g. aircraft) |
| [...] | | |
| NOTE 6: The maximum differential delay at cell level has been computed considering the one at beam level for largest beam size. It does not preclude that cell may include more than one beam when beam size are small or medium size. However the cumulated differential delay of all beams within a cell will not exceed the maximum differential delay at cell level in the table above. | | |

************************* Quotation End *************************

In the current NR RRC specification [3] 3GPP TS 38.331 V16.5.0, the conditional handover procedure is specified:

\*\*\*\*\*\*\*\*\*\*\*\*\*\*\*\*\*\*\*\*\*\*\*\*\*\*\*\*\*\*\*\*\*\*\*\*\* Quotation Start \*\*\*\*\*\*\*\*\*\*\*\*\*\*\*\*\*\*\*\*\*\*\*\*\*\*\*\*\*\*\*\*\*\*\*\*\*\*\*\*

5.3.5.13 Conditional Reconfiguration

5.3.5.13.1 General

The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the *ConditionalReconfiguration* IE.

The UE performs the following actions based on a received *ConditionalReconfiguration* IE:

1> if the *ConditionalReconfiguration* contains the *condReconfigToRemoveList*:

2> perform conditional reconfiguration removal procedure as specified in 5.3.5.13.2;

1> if the *ConditionalReconfiguration* contains the *condReconfigToAddModList*:

2> perform conditional reconfiguration addition/modification as specified in 5.3.5.13.3;

5.3.5.13.2 Conditional reconfiguration removal

The UE shall:

1> for each *condReconfigId* value included in the *condReconfigToRemoveList* that is part of the current UE conditional reconfiguration in *VarConditionalReconfig*:

2> remove the entry with the matching *condReconfigId* from the *VarConditionalReconfig*;

NOTE: The UE does not consider the message as erroneous if the *condReconfigToRemoveList* includes any cond*ReconfigId* value that is not part of the current UE configuration.

5.3.5.13.3 Conditional reconfiguration addition/modification

For each *condReconfigId* received in the *condReconfigToAddModList* IE the UE shall:

1> if an entry with the matching *condReconfigId* exists in the *condReconfigToAddModList* within the *VarConditionalReconfig*:

2> if the entry in *condReconfigToAddModList* includes an *condExecutionCond*;

3> replace *condExecutionCond* within the *VarConditionalReconfig* with the value received for this *condReconfigId*;

2> if the entry in *condReconfigToAddModList* includes an *condRRCReconfig*;

3> replace *condRRCReconfig* within the *VarConditionalReconfig* with the value received for this *condReconfigId*;

1> else:

2> add a new entry for this *condReconfigId* within the *VarConditionalReconfig*;

1> perform conditional reconfiguration evaluation as specified in 5.3.5.13.4;

5.3.5.13.4 Conditional reconfiguration evaluation

The UE shall:

1> for each *condReconfigId* within the *VarConditionalReconfig*:

2> consider the cell which has a physical cell identity matching the value indicated in the *ServingCellConfigCommon* included in the *reconfigurationWithSync* in the received *condRRCReconfig* to be applicable cell;

2> for each *measId* included in the *measIdList* within *VarMeasConfig* indicated in the *condExecutionCond* associated to *condReconfigId*:

3> if the entry condition(s) applicable for this event associated with the *condReconfigId*, i.e. the event corresponding with the *condEventId(s)* of the corresponding *condTriggerConfig* within *VarConditionalReconfig*, is fulfilled for the applicable cells for all measurements after layer 3 filtering taken during the corresponding *timeToTrigger* defined for this event within the *VarConditionalReconfig*:

4> consider the event associated to that *measId* to be fulfilled;

3> if the leaving condition(s) applicable for this event associated with the *condReconfigId*, i.e. the event corresponding with the *condEventId(s)* of the corresponding *condTriggerConfig* within *VarConditionalReconfig*, is fulfilled for the applicable cells for all measurements after layer 3 filtering taken during the corresponding *timeToTrigger* defined for this event within the *VarConditionalReconfig*:

4> consider the event associated to that *measId* to be not fulfilled;

2> if event(s) associated to all *measId*(s) within *condTriggerConfig* for a target candidate cell within the stored *condRRCReconfig* are fulfilled:

3> consider the target candidate cell within the stored *condRRCReconfig*, associated to that *condReconfigId*, as a triggered cell;

3> initiate the conditional reconfiguration execution, as specified in 5.3.5.13.5;

NOTE: Up to 2 *MeasId* can be configured for each *condReconfigId*. The conditional reconfiguration event of the 2 *MeasId* may have the same or different event conditions, triggering quantity, time to trigger, and triggering threshold.

5.3.5.13.5    Conditional reconfiguration execution

The UE shall:

1> if more than one triggered cell exists:

2> select one of the triggered cells as the selected cell for conditional reconfiguration execution;

1> for the selected cell of conditional reconfiguration execution:

2> apply the stored *condRRCReconfig* of the selected cell and perform the actions as specified in 5.3.5.3;

NOTE:    If multiple NR cells are triggered in conditional reconfiguration execution, it is up to UE implementation which one to select, e.g. the UE considers beams and beam quality to select one of the triggered cells for execution.

\*\*\*\*\*\*\*\*\*\*\*\*\*\*\*\*\*\*\*\*\*\*\*\*\*\*\*\*\*\*\*\*\* Quotation End \*\*\*\*\*\*\*\*\*\*\*\*\*\*\*\*\*\*\*\*\*\*\*\*\*\*\*\*\*\*\*\*\*\*\*\*\*\*\*

The stage 3 running RRC CR for NTN Rel-17 ([4] R2-2106541) is also quoted below:

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* Quotation Start \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

5.5.4.xx Event L1 (FFS)

The UE shall:

1> consider the entering condition for this event to be satisfied when condition L1-1, as specified below, is fulfilled;

Inequality L1-1 (Entering condition)

$$Ml > Thresh$$

The variables in the formula are defined as follows:

*Ml* is the UE location, not taking into account any offsets but represented by the distance between UE and a reference location configured by the serving cell.

*Thresh* is the threshold parameter for this event (i.e. *l1-Threshold* as defined within *reportConfigNR* for this event).

*Ml* is expressed in FFS.

*Thresh* is expressed in the same unit as *Ml*.

*--Editors Note: FFS leaving condition, definition of reference location, other details like hysteresis--*

NOTE: The definition of Event L1 also applies to CondEvent L1.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* Next Quotation \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

– *ReportConfigNR*

The IE *ReportConfigNR* specifies criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell;

Event L1: Distance between UE and a reference location becomes larger than configured treshold;

CondEvent A3: Conditional reconfiguration candidate becomes amount of offset better than PCell/PSCell;

CondEvent A4: Conditional reconfiguration candidate becomes better than absolute threshold;

CondEvent A5: PCell/PSCell becomes worse than absolute threshold1 AND Conditional reconfiguration candidate becomes better than another absolute threshold2;

CondEvent L1: Distance between UE and a reference location becomes larger than configured treshold;

CondEvent T1: Time measured at UE becomes more than configured threshold;

For event I1, measurement reporting event is based on CLI measurement results, which can either be derived based on SRS-RSRP or CLI-RSSI.

Event I1: Interference becomes higher than absolute threshold.

*ReportConfigNR* information element

```
ReportConfigNR ::=                      SEQUENCE {
    reportType                          CHOICE {
        [...]
        eventTriggered                      EventTriggerConfig,
        [...]
        condTriggerConfig-r16               CondTriggerConfig-r16,
        [...]
    }
}
```

[…]

```
CondTriggerConfig-r16 ::=       SEQUENCE {
    condEventId                     CHOICE {
        condEventA3                     SEQUENCE {
            a3-Offset                       MeasTriggerQuantityOffset,
            hysteresis                      Hysteresis,
            timeToTrigger                   TimeToTrigger
        },
        condEventA5                     SEQUENCE {
            a5-Threshold1                   MeasTriggerQuantity,
            a5-Threshold2                   MeasTriggerQuantity,
            hysteresis                      Hysteresis,
            timeToTrigger                   TimeToTrigger
        },
        ..., condEventA4                                     SEQUENCE {
            a4-Threshold                                    MeasTriggerQuantity,
            reportOnLeave                                   BOOLEAN,
            hysteresis                                      Hysteresis,
            timeToTrigger                                   TimeToTrigger,
            useWhiteCellList                                BOOLEAN
        },
        condEventL1-r17                         SEQUENCE {
            l1-Threshold                            MeasTriggerLocation,
            FFS
        },
        conEventT1-r17                          SEQUENCE {
            t1-Threshold                            t2      -- Need R
        }

},
    rsType-r16                  NR-RS-Type,
    ...
}

EventTriggerConfig::=                   SEQUENCE {
    eventId                                 CHOICE {
        eventA1                                 SEQUENCE {
            a1-Threshold                            MeasTriggerQuantity,
            reportOnLeave                           BOOLEAN,
            hysteresis                              Hysteresis,
            timeToTrigger                           TimeToTrigger
        },
        eventA2                                 SEQUENCE {
            a2-Threshold                            MeasTriggerQuantity,
            reportOnLeave                           BOOLEAN,
            hysteresis                              Hysteresis,
```

```
        timeToTrigger                       TimeToTrigger
    },
    eventA3                             SEQUENCE {
        a3-Offset                           MeasTriggerQuantityOffset,
        reportOnLeave                       BOOLEAN,
        hysteresis                          Hysteresis,
        timeToTrigger                       TimeToTrigger,
        useWhiteCellList                    BOOLEAN
    },
    eventA4                             SEQUENCE {
        a4-Threshold                        MeasTriggerQuantity,
        reportOnLeave                       BOOLEAN,
        hysteresis                          Hysteresis,
        timeToTrigger                       TimeToTrigger,
        useWhiteCellList                    BOOLEAN
    },
    eventA5                             SEQUENCE {
        a5-Threshold1                       MeasTriggerQuantity,
        a5-Threshold2                       MeasTriggerQuantity,
        reportOnLeave                       BOOLEAN,
        hysteresis                          Hysteresis,
        timeToTrigger                       TimeToTrigger,
        useWhiteCellList                    BOOLEAN
    },
    eventA6                             SEQUENCE {
        a6-Offset                           MeasTriggerQuantityOffset,
        reportOnLeave                       BOOLEAN,
        hysteresis                          Hysteresis,
        timeToTrigger                       TimeToTrigger,
        useWhiteCellList                    BOOLEAN
    },
    ... ,
    eventL1-r17                         SEQUENCE {
        l1-Threshold                        MeasTriggerLocation,
        FFS
    }
},
rsType                                  NR-RS-Type,
reportInterval                          ReportInterval,
reportAmount                            ENUMERATED {r1, r2, r4, r8, r16, r32, r64, infinity},
reportQuantityCell                      MeasReportQuantity,
maxReportCells                          INTEGER (1..maxCellReport),
reportQuantityRS-Indexes                MeasReportQuantity
OPTIONAL,   -- Need R
maxNrofRS-IndexesToReport               INTEGER (1..maxNrofIndexesToReport)
OPTIONAL,   -- Need R
includeBeamMeasurements                 BOOLEAN,
reportAddNeighMeas                      ENUMERATED {setup}
OPTIONAL,   -- Need R
```

```
    ...,
    measRSSI-ReportConfig-r16            MeasRSSI-ReportConfig-r16
OPTIONAL,    -- Need R
    useT312 r16                          BOOLEAN
OPTIONAL,    -- Need M
    includeCommonLocationInfo-r16        ENUMERATED {true}
OPTIONAL,    -- Need R
    [...]
}

[...]

NR-RS-Type ::=                           ENUMERATED {ssb, csi-rs}

MeasTriggerQuantity ::=                  CHOICE {
    rsrp                                     RSRP-Range,
    rsrq                                     RSRQ-Range,
    sinr                                     SINR-Range
}

MeasTriggerQuantityOffset ::=            CHOICE {
    rsrp                                     INTEGER (-30..30),
    rsrq                                     INTEGER (-30..30),
    sinr                                     INTEGER (-30..30)
}

MeasReportQuantity ::=                   SEQUENCE {
    rsrp                                     BOOLEAN,
    rsrq                                     BOOLEAN,
    sinr                                     BOOLEAN
}

[...]

MeasTriggerLocation-r17 ::=              SEQUENCE {
    cellReferenceLocation                    FFS,
    distanceFromReference                    FFS
}
```

********************************************* Quotation End *********************************************

In 3GPP TR 38.821 ([2] 3GPP TR 38.821 V16.1.0), movement of a satellite is specified:

************************************* Quotation Start *************************************

7.3.2.1.4 Frequent and unavoidable handover

Satellites in non-GEO orbits move with high speed relative to a fixed position on earth, leading to frequent and unavoidable handover for both stationary and moving UEs. This may result in significant signalling overhead and impact power consumption, as well as exacerbating other potential challenges related to mobility e.g. service interruption due to signalling latency.

For a UE travelling at a constant speed and direction, the maximum time it can remain connected to a cell is approximated by dividing the cell diameter by UE speed. For NTN LEO deployments, the cell size is divided by the relative speed between the satellite and the UE, where a UE moving in the same direction as the satellite subtracts from the relative speed, and a UE moving in the opposite direction increases relative speed, described by the equation below:

$$\text{Time to HO(s)} = \frac{\text{cell size(km)}}{\text{UE speed}\left(\frac{\text{km}}{\text{hr}}\right) \cdot \left(\frac{1\text{hr}}{3600\text{s}}\right) + \text{satellite speed}\left(\frac{\text{km}}{\text{s}}\right)}$$

The scenario of cell diameter = one 50 km diameter beam will represent the lower bound (i.e. worst-case scenario for HO frequency), and cell diameter = 1000 km will be taken as the upper bound (i.e. best-case scenario for HO frequency).

Substituting reference values from 4.2-2 and 7.1-1 into the above equation, the maximum time a UE can remain in an NTN cell (i.e. the UE connects immediately at cell edge and leaves at the opposite cell edge) for the min/max cell diameter and relative speed is listed in the table below:

Table 7.3.2.1.4-1: Time to HO for min/max cell diameter and varying UE speed

| Cell Diameter Size (km) | UE Speed (km/hr) | Satellite Speed (km/s) | Time to HO (s) |
|---|---|---|---|
| 50 (lower bound) | +500 | 7.56 (NOTE 1) | 6.49 |
| | -500 | | 6.74 |
| | +1200 | | 6.33 |
| | - 1200 | | 6.92 |
| | Neglected | | 6.61 |
| 1000 (upper bound) | +500 | | 129.89 |
| | -500 | | 134.75 |
| | +1200 | | 126.69 |
| | - 1200 | | 138.38 |
| | Neglected | | 132.28 |

Neglecting UE movement, a UE served by an NTN LEO cell of diameter 50 km and 1000 km may remained connected for a maximum of 6.61 seconds and 132.38 seconds respectively due to satellite movement. Considering UE movement, this will vary by approximately +/- 4%. By neglecting satellite speed and setting UE speed to 500 km/hr as per table 7.1-1, this is equivalent to a terrestrial UE being served by a cell diameter ranging from approximately 0.918 km (NOTE 2) to 18.39 km.

From the above analysis, it is concluded that HO frequency in LEO NTN can be similar to that experienced by a terrestrial UE on a high-speed train, however this represents a worst-case scenario and is not indicative of a typical terrestrial network. It is not anticipated that frequent HO will occur in GEO due to large cell size limiting the impact of UE speed. It is further assumed in LEO scenarios UE speed is a negligible factor in HO frequency given the relative speed of the satellite, and this will principally be an issue for LEO with moving beams.

NOTE 1: This value may need to be updated further pending clarification from satellite companies (e.g. if this is the ground speed, and what altitude this value corresponds to).

NOTE 2: it is assumed that this is the minimum cell diameter possible (i.e. the UE travels directly through the full cell diameter). Should the UE only travel through an edge portion of the coverage the cell must be larger.

\*\*\*\*\*\*\*\*\*\*\*\*\*\*\*\*\*\*\*\*\*\*\*\*\*\*\*\*\*\* Quotation End \*\*\*\*\*\*\*\*\*\*\*\*\*\*\*\*\*\*\*\*\*\*\*\*\*\*\*\*\*\*\*\*\*\*\*\*\*\*\*\*\*\*\*\*

In addition, ephemeris data for NTN is specified in 3GPP TR 38.821 ([2] 3GPP TR 38.821 V16.1.0):

\*\*\*\*\*\*\*\*\*\*\*\*\*\*\*\*\*\*\*\*\*\*\*\*\*\*\*\*\* Quotation Start \*\*\*\*\*\*\*\*\*\*\*\*\*\*\*\*\*\*\*\*\*\*\*\*\*\*\*\*\*\*\*\*\*\*\*\*\*\*\*

7.3.6 Ephemeris Data for NTN

7.3.6.1 Representation of Complete Ephemeris Data

Ephemeris data contains the information about the orbital trajectories of artificial satellites as described in Annex A. There are different possible representations of ephemeris data. One possibility is to use orbital parameters, e.g. semi-major axis, eccentricity, inclination, right ascension of the ascending node, argument of periapsis, mean anomaly at a reference point in time, and the epoch. The first five parameters can determine an orbital plane, and the other two parameters are used to determine exact satellite location at a time. A description table for the orbital parameters and the corresponding illustrations are as below.

Table 7.3.6.1-1: Essential Elements of Ephemeris

| | | |
|---|---|---|
| Orbital plane parameters | $\sqrt{a}$ | Square root of semi major axis (semi-major axis) |
| | $e$ | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

NOTE: True anomaly is the actual measured angle in the orbital plane between the vector extending from the focus to the point of periapsis and the vector extending from the focus to the object's actual position. Mean anomaly is the angle between the periapsis point and the imagined position of an object for the same elapsed time since periapsis for a circular orbit around the same body with the same orbital position. The key difference is that mean anomaly always increases linearly with time. The true anomaly, in general, does not, except if the orbital is circular, in which case the mean anomaly and true anomaly are almost identical. True and mean anomaly can be linked together thanks to the eccentric anomaly.

Figure 5:
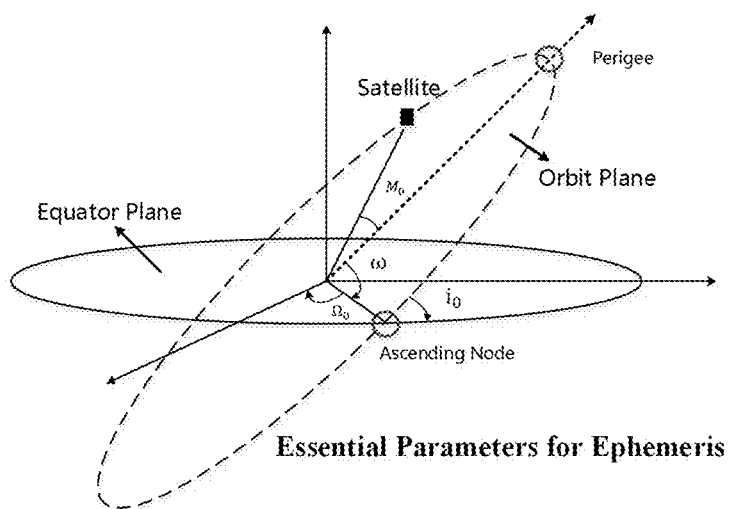
FIG. 5 is a reproduction of FIG. 7.3.6-1 of 3GPP TR 38.821: Satellite Orbit and Keplerian Elements.
Figure 7:
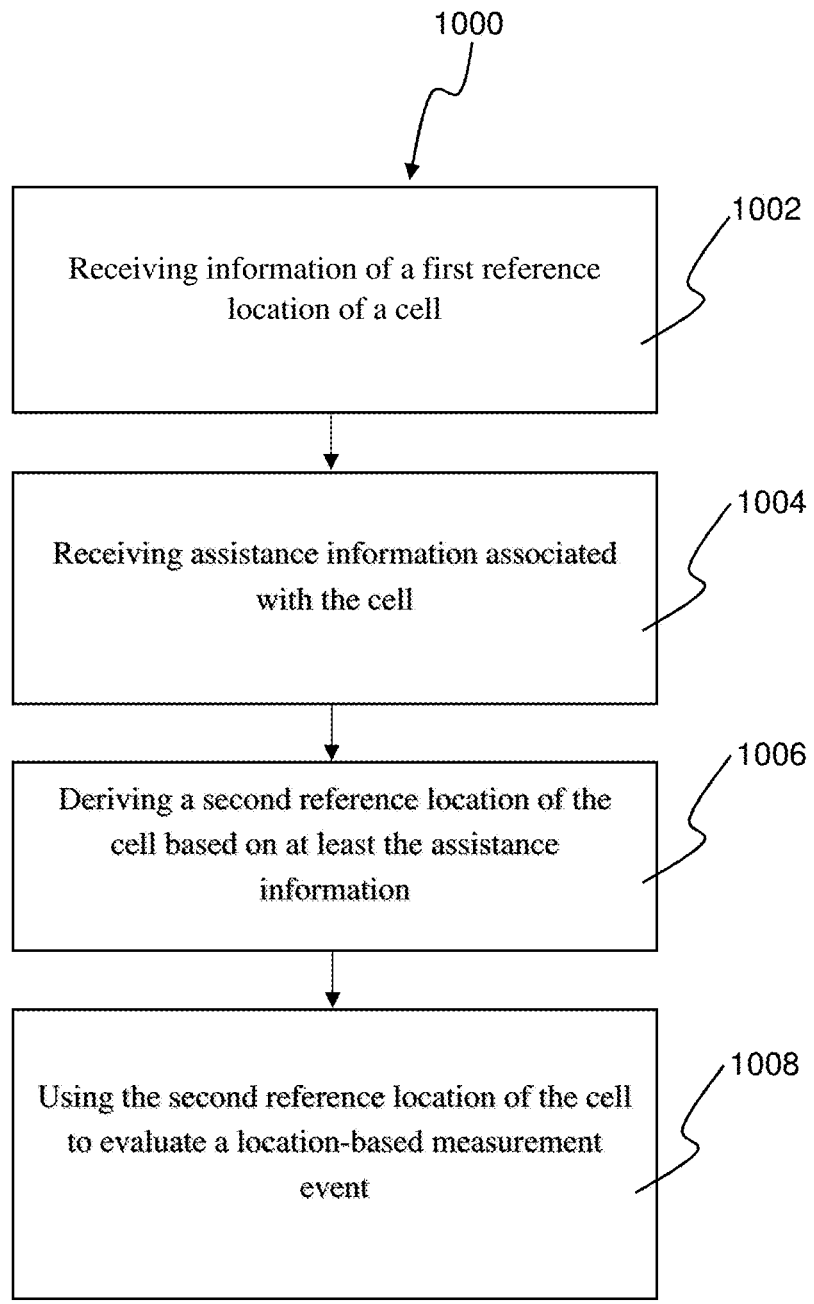
FIG. 7 is a flow diagram of a method of a UE receiving information of a first reference location of a cell, in accordance with embodiments of the present invention.

FIG. 5 is a reproduction of Figure 7.3.6-1 of 3GPP TR 38.821: Satellite Orbit and Keplerian Elements.

Another possible option is to provide the location of the satellite in coordinates (x, y, z), e.g. ECEF coordinates. For anything else than GEO, additionally a velocity vector (vx, vy, vz) and again a reference point in time are needed.

NOTE: It seems that this option has the drawback that – for LEO satellites – it prevents the UE from extrapolating the satellite track for more than a very short time into the future. Since a LEO satellite moves very fast, the given position (x, y, z) may be outdated in a short period of time. And since the satellite moves in an elliptical orbit, providing a velocity vector (vx, vy, vz) does not help much; so it remains to be studied the required accuracy –to determine the satellite location with acceptable precision. As a result, the satellite would need to provide (e.g. broadcast) an updated location very often, about every few minutes. Furthermore, for the same reason it is unclear how to pre-provision a UE with ephemeris information in coordinates.

7.3.6.2 Provision and Use of Ephemeris Data

In all cases, the minimum representation needs at least seven double-precision floating point numbers, plus some overhead. This means that, for satellite networks with many satellites, the ephemeris data can be quite substantial. The exact data size for a LEO network depends on the number of satellites, which may be several hundreds, and the accuracy of which the ephemeris parameters are represented.

In a satellite network, the orbits of all satellites are however not independent, as several satellites typically share a common orbital plane. To reduce the amount of data needed, the ephemeris data could provide information not for every single satellite, but only for the common orbital planes. Even for a network with 100 orbital planes, the ephemeris data would then amount to only a few kB. The ephemeris data may be provisioned a file containing the ephemeris data in the uSIM of the UE or directly in UE itself.

As mentioned above, the size of the ephemeris data can be quite substantial for networks with many satellites, and easily exceeds the capacity of a uSIM which is one way for pre-provisioning the ephemeris data, which typically is 128 kB. The ephemeris data file on the uSIM may thus contain only information about the orbital planes. In this case, the ephemeris data would not provide the location of a specific satellite but describe an arc in the sky above the UE which the UE would need to scan for a satellite. According to the definitions of orbital parameters, the first five parameters, i.e. semi-major axis, eccentricity, inclination, right ascension of the ascending node, argument of periapsis, are used to determine the elliptical orbit. So these parameters can be provisioned to UE as baseline ephemeris data.

These baseline ephemeris data or orbital planes may be indexed and further quantized and sub-indexed. The indexes can then be used in RRC in an efficient way to point to stored ephemeris data. The UE can be given information about ephemeris data of other cells by using the ephemeris plane information. For example, when a UE is asked to do RRM measurements, the UE is given the index of the orbital plane where the cell to be measured can be found.

With the help of ephemeris data, a UE may search for the first NTN cell it could connect to. After detecting PSS/SSS (SSB) of a cell broadcasted by a satellite, the UE may be able to read the initial system information of that cell. Ideally, before attempting to access the cell, the UE knows the RTT well enough to be able to do random access. For this, the initial system information may need to contain further ephemeris information on the exact location of the cell (or the satellite broadcasting the cell). This information can be given with respect to the orbital plane that the UE already has information about.

Considering that the orbit-plane level orbital parameters are not sufficient to derive the satellite position while the satellite level orbital parameters is more helpful for UE to search for the first NTN cell and perform initial access, it is worthwhile evaluating some other solutions to provide satellite level orbital parameters. In addition to the first five orbital parameters for orbital plane, the other two orbital parameters including mean anomaly at a reference point in time and the epoch are used to determine the exact satellite location at a time.

As mentioned above, the main concern for proving the satellite level orbital parameters is about the size of such information. However, there is no need for a UE to store orbital parameters for all the satellites. If the orbital parameters per satellite are pre-provisioned, UE only needs to store the ephemeris data for the satellites that may serve UE Another possible solution to address the size concern of the satellite level orbital parameters is to broadcast the orbital parameters of the serving satellite and several neighbouring satellites which will be sufficient for initial access and mobility handling at UE side. Thus, the following solutions can be considered to provide orbital parameters per satellite:

- Pre-provision satellite level orbital parameters for all the satellites that may serve the UE in uSIM/UE and the ephemeris data for each satellite can be linked to a satellite ID or index. Broadcast the satellite ID or index of the serving satellite in system information so that UE is able to find the corresponding detailed ephemeris data stored in uSIM to derive the position coordinates of the serving satellite. The satellite ID or index of neighbour satellites can also be provided to UE via system information or dedicated RRC signalling to assist mobility handling.

- Broadcast satellite level orbital parameters of the serving satellite in system information and UE will derive the position coordinates of the serving satellite. The ephemeris data of the neighbouring satellites can also be provided to UE via system information or dedicated RRC signalling.. In case the baseline orbital plane parameters are provisioned in uSIM/UE, only mean anomaly at a reference point in time and the epoch need to be broadcasted to UE, in this way signalling overhead can be reduced significantly.

7.3.6.3 Updating Stored Ephemeris Data

For the solutions in which the orbital parameters for the common orbit planes or for all the satellites that may serve the UE are pre-provisioned, the accuracy of the prediction of a satellite orbit or the satellite position decreases the further in the future one tries to extend the prediction. It might thus be needed to update the ephemeris data stored in the UE. The validity time of stored ephemeris data might depend on the orbital parameters of the NTN satellite, and on the required accuracy of its prediction. Since the validity time determines the frequency of the updates, it should be studied further.

The main purpose of the ephemeris data provided by network is to provide the UE with ephemeris data for initial access, e.g. if it is expected to be switched off for a longer time; or in other words, as a replacement for the data stored in the UE. As such, it may also contain information on orbital plane level or on satellite level.

The UE should always use the most current ephemeris data. Once the UE has obtained new ephemeris data, the parameters stored in the UE are thus obsolete and should no longer be used or be overwritten with the newer values. Every parameter in the UE has an associated priority statement. By giving the parameters in the UE lower priority, the UE can be prevented from using the obsolete values stored in the UE.

**************************** Quotation End ****************************************

The procedure of intra-frequency measurements is specified in TS 38.304 ([7] 3GPP TS 38.304 V17.0.0):

************************************** Quotation Start **************************************

5.2.4.2 Measurement rules for cell re-selection

Following rules are used by the UE to limit needed measurements:

- If the serving cell fulfils Srxlev > $S_{IntraSearchP}$ and Squal > $S_{IntraSearchQ}$:

- If *distanceThresh* is broadcasted in SIBxx, and if UE supports location-based measurement initiation and has valid UE location information:

- If the distance between UE and the serving cell reference location is shorter than *distanceThresh*, the UE may choose not to perform intra-frequency measurements;

- Otherwise, the UE shall perform intra-frequency measurements;

- Otherwise, the UE may choose not to perform intra-frequency measurements;

- Otherwise, the UE shall perform intra-frequency measurements.

- The UE shall apply the following rules for NR inter-frequencies and inter-RAT frequencies which are indicated in system information and for which the UE has priority provided as defined in 5.2.4.1:

- For a NR inter-frequency or inter-RAT frequency with a reselection priority higher than the reselection priority of the current NR frequency, the UE shall perform measurements of higher priority NR inter-frequency or inter-RAT frequencies according to TS 38.133 [8].

- For a NR inter-frequency with an equal or lower reselection priority than the reselection priority of the current NR frequency and for inter-RAT frequency with lower reselection priority than the reselection priority of the current NR frequency:

- If the serving cell fulfils Srxlev > $S_{nonIntraSearchP}$ and Squal > $S_{nonIntraSearchQ}$:

- If *distanceThresh* is broadcasted in SIBxx, and if UE supports location-based measurement initiation and has valid UE location information:

- If the distance between UE and the serving cell reference location is shorter than *distanceThresh*, the UE may choose not to perform measurements of NR inter-frequency cells of equal or lower priority, or inter-RAT frequency cells of lower priority;

- Otherwise, the UE shall perform measurements of NR inter-frequency cells of equal or lower priority, or inter-RAT frequency cells of lower priority according to TS 38.133 [8];

- Otherwise, the UE may choose not to perform measurements of NR inter-frequency cells of equal or lower priority, or inter-RAT frequency cells of lower priority;

- Otherwise, the UE shall perform measurements of NR inter-frequency cells of equal or lower priority, or inter-RAT frequency cells of lower priority according to TS 38.133 [8].

- If the UE supports relaxed measurement and *relaxedMeasurement* is present in *SIB2*, the UE may further relax the needed measurements, as specified in clause 5.2.4.9.

If the *t-Service* of the serving cell is present in SIB19, UE should start to perform intra-frequency, inter-frequency or inter-RAT measurements before the t-Service, regardless of the distance between UE and the serving cell reference location or whether the serving cell fulfils Srxlev > SIntraSearchP and Squal > SIntraSearchQ, or Srxlev > SnonIntraSearchP and Squal > SnonIntraSearchQ and the exact time to start measurement before *t-Service* is up to UE implementation. UE shall perform measurements of higher priority NR inter-frequency or inter-RAT frequencies according to TS 38.133 [8] regardless of the remaining service time of the serving cell.

NOTE: When evaluating the distance between UE and the serving cell reference location, it's up to UE implementation to have available UE location information.

************************** Quotation End **************************

In the current NR RRC specification ([3] 3GPP TS 38.331 V16.5.0), the measurement reporting is specified:

\*\*\*\*\*\*\*\*\*\*\*\*\*\*\*\*\*\*\*\*\*\*\*\*\*\*\*\*\*\*\*\*\*\*\*\*\*\*\*\* Quotation Start \*\*\*\*\*\*\*\*\*\*\*\*\*\*\*\*\*\*\*\*\*\*\*\*\*\*\*\*\*\*\*\*\*\*\*\*\*\*\*\*

5.5.1 Introduction

The network may configure an RRC_CONNECTED UE to perform measurements. The network may configure the UE to report them in accordance with the measurement configuration or perform conditional reconfiguration evaluation in accordance with the conditional reconfiguration. The measurement configuration is provided by means of dedicated signalling i.e. using the *RRCReconfiguration* or *RRCResume*.

The network may configure the UE to perform the following types of measurements:

- NR measurements;

- Inter-RAT measurements of E-UTRA frequencies.

- Inter-RAT measurements of UTRA-FDD frequencies.

The network may configure the UE to report the following measurement information based on SS/PBCH block(s):

- Measurement results per SS/PBCH block;

- Measurement results per cell based on SS/PBCH block(s);

- SS/PBCH block(s) indexes.

The network may configure the UE to report the following measurement information based on CSI-RS resources:

- Measurement results per CSI-RS resource;

- Measurement results per cell based on CSI-RS resource(s);

- CSI-RS resource measurement identifiers.

The network may configure the UE to perform the following types of measurements for NR sidelink and V2X sidelink:

- CBR measurements.

The network may configure the UE to report the following CLI measurement information based on SRS resources:

- Measurement results per SRS resource;

- SRS resource(s) indexes.

The network may configure the UE to report the following CLI measurement information based on CLI-RSSI resources:

- Measurement results per CLI-RSSI resource;

- CLI-RSSI resource(s) indexes.

The measurement configuration includes the following parameters:

1. Measurement objects: A list of objects on which the UE shall perform the measurements.

- For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

- The *measObjectId* of the MO which corresponds to each serving cell is indicated by *servingCellMO* within the serving cell configuration.

- For inter-RAT E-UTRA measurements a measurement object is a single E-UTRA carrier frequency. Associated with this E-UTRA carrier frequency, the network can configure a list of cell specific offsets and a list of 'blacklisted' cells. Blacklisted cells are not applicable in event evaluation or measurement reporting.

- For inter-RAT UTRA-FDD measurements a measurement object is a set of cells on a single UTRA-FDD carrier frequency.

- For CBR measurement of NR sidelink communication, a measurement object is a set of transmission resource pool(s) on a single carrier frequency for NR sidelink communication.

- For CLI measurements a measurement object indicates the frequency/time location of SRS resources and/or CLI-RSSI resources, and subcarrier spacing of SRS resources to be measured.

2. Reporting configurations: A list of reporting configurations where there can be one or multiple reporting configurations per measurement object. Each measurement reporting configuration consists of the following:

- Reporting criterion: The criterion that triggers the UE to send a measurement report. This can either be periodical or a single event description.

- RS type: The RS that the UE uses for beam and cell measurement results (SS/PBCH block or CSI-RS).

- Reporting format: The quantities per cell and per beam that the UE includes in the measurement report (e.g. RSRP) and other associated information such as the maximum number of cells and the maximum number beams per cell to report.

In case of conditional reconfiguration, each configuration consists of the following:

- Execution criteria: The criteria the UE uses for conditional reconfiguration execution.

- RS type: The RS that the UE uses for obtaining beam and cell measurement results (SS/PBCH block-based or CSI-RS-based), used for evaluating conditional reconfiguration execution condition.

3. Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED maintains a measurement object list, a reporting configuration list, and a measurement identities list according to signalling and procedures in this specification. The measurement object list possibly includes NR measurement object(s), CLI measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The NR serving cell(s) – these are the SpCell and one or more SCells.

2. Listed cells – these are cells listed within the measurement object(s).

3. Detected cells – these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells and, for RSSI and channel occupancy measurements, the UE measures and reports on the configured resources on the indicated frequency. For inter-RAT measurements object(s) of UTRA-FDD, the UE measures and reports on listed cells. For CLI measurement object(s), the UE measures and reports on configured measurement resources (i.e. SRS resources and/or CLI-RSSI resources).

Whenever the procedural specification, other than contained in sub-clause 5.5.2, refers to a field it concerns a field included in the *VarMeasConfig* unless explicitly stated otherwise i.e. only the measurement configuration procedure covers the direct UE action related to the received *measConfig*.

\*\*\*\*\*\*\*\*\*\*\*\*\*\*\*\*\*\*\*\*\*\*\*\*\*\*\*\*\*\*\*\*\*\* Quotation End \*\*\*\*\*\*\*\*\*\*\*\*\*\*\*\*\*\*\*\*\*\*\*\*\*\*\*\*\*\*\*\*\*\*\*\*\*\*\*\*

The stage 3 running RRC CR for NTN Rel-17 ([5] draft R2-2110710 V13) is also quoted below:

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* Quotation Start \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

5.5.4.xx Event L1 (FFS)

The UE shall:

1> consider the entering condition for this event to be satisfied when both condition L1-1 and conditionL1-2, as specified below, is fulfilled;

Inequality L1-1 (Entering condition 1)

$Ml1 + Hys > Thresh1$

Inequality L1-2 (Entering condition 2)

$Ml2 + Hys < Thresh2$

The variables in the formula are defined as follows:

*Ml1* is the UE location, not taking into account any offsets but represented by the distance between UE and a reference location parameter for this event (i.e. *referenceLocation1* as defined within *reportConfigNR* for this event).

*Ml2* is the UE location, not taking into account any offsets but represented by the distance between UE and a reference location parameter for this event (i.e. *referenceLocation2* as defined within *reportConfigNR* for this event).

*Hys* is the hysteresis parameter for this event (i.e. *hysteresis* as defined within *reportConfigNR* for this event).

*Thresh1* is the threshold for this event defined as a distance, configured with parameter *distanceFromReference1*, from a reference location configured with parameter *referenceLocation1* within *reportConfigNR* for this event.

*Thresh2* is the threshold for this event defined as a distance, configured with parameter *distanceFromReference2*, from a reference location configured with parameter *referenceLocation2* within *reportConfigNR* for this event.

[...]

Editor's Note: FFS leaving condition, definition of reference location,

Editor's note: Need of user consent for location reporting is pending on response from SA3 thus reporting details are not yet captured and are considered as FFS..

NOTE: The definition of Event L1 also applies to CondEvent L1.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* Next Quotation \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

– *ReportConfigNR*

The IE *ReportConfigNR* specifies criteria for triggering of an NR measurement reporting event or of a CHO or CPC event. For events labelled AN with N equal to 1, 2 and so on, measurement reporting events and CHO or CPC events are based on cell measurement results, which can either be derived based on SS/PBCH block or CSI-RS.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell;

Event L1: Distance between UE and a reference location *referenceLocation1* becomes larger than configured threshold1 *Thresh1* and distance between UE and a reference location *referenceLocation2* becomes shorter than configured threshold *Thresh2*

CondEvent A3: Conditional reconfiguration candidate becomes amount of offset better than PCell/PSCell;

CondEvent A4: Conditional reconfiguration candidate becomes better than absolute threshold;

CondEvent A5: PCell/PSCell becomes worse than absolute threshold1 AND Conditional reconfiguration candidate becomes better than another absolute threshold2;

CondEvent L1: Distance between UE and a reference location *referenceLocation1* becomes larger than configured threshold *Thresh1* and distance between UE and a reference location *referenceLocation2* becomes shorter than configured threshold *Thresh2*;

CondEvent T1: Time measured at UE becomes more than configured threshold *t1-Threshold* but is less than *t2-Threshold*;

[...]

*ReportConfigNR* information element

```
ReportConfigNR ::=                    SEQUENCE {
    reportType                            CHOICE {
        periodical                            PeriodicalReportConfig,
        eventTriggered                        EventTriggerConfig,
        [...]
        condTriggerConfig-r16                 CondTriggerConfig-r16,
        [...]
```

```
        }
    }

[…]

CondTriggerConfig-r16 ::=          SEQUENCE {
    condEventId                        CHOICE {
        condEventA3                        SEQUENCE {
            a3-Offset                          MeasTriggerQuantityOffset,
            hysteresis                         Hysteresis,
            timeToTrigger                      TimeToTrigger
        },
        condEventA5                        SEQUENCE {
            a5-Threshold1                      MeasTriggerQuantity,
            a5-Threshold2                      MeasTriggerQuantity,
            hysteresis                         Hysteresis,
            timeToTrigger                      TimeToTrigger
        },
        ...,
        condEventA4-r17                            SEQUENCE {
            a4-Threshold                           MeasTriggerQuantity,
            reportOnLeave                          BOOLEAN,
            hysteresis                             Hysteresis,
            timeToTrigger                          TimeToTrigger,
            useWhiteCellList                       BOOLEAN
        },
        condEventL1-r17                    SEQUENCE {
            distanceThresFromReference1-r17        TypeFFS,
            distanceThresFromReference2-r17        TypeFFS,
            referenceLocation1-r17                 ReferenceLocation-r17,
            referenceLocation2-r17                 ReferenceLocation-r17,
            hysteresis                             HysteresisLocation-r17,
            timeToTrigger                          TimeToTrigger
        },
        condEventT1-r17                    SEQUENCE {
            t1-Threshold-r17                           INTEGER (0..549755813887),
            t2-Threshold-r17                           TypeFFS
        }
    },
    rsType-r16              NR-RS-Type,
    ...
}

EventTriggerConfig::=                      SEQUENCE {
    eventId                                    CHOICE {
        eventA1                                    SEQUENCE {
            a1-Threshold                               MeasTriggerQuantity,
            reportOnLeave                              BOOLEAN,
            hysteresis                                 Hysteresis,
```

```
            timeToTrigger                           TimeToTrigger
        },
        eventA2                                 SEQUENCE {
            a2-Threshold                            MeasTriggerQuantity,
            reportOnLeave                           BOOLEAN,
            hysteresis                              Hysteresis,
            timeToTrigger                           TimeToTrigger
        },
        eventA3                                 SEQUENCE {
            a3-Offset                               MeasTriggerQuantityOffset,
            reportOnLeave                           BOOLEAN,
            hysteresis                              Hysteresis,
            timeToTrigger                           TimeToTrigger,
            useWhiteCellList                        BOOLEAN
        },
        eventA4                                 SEQUENCE {
            a4-Threshold                            MeasTriggerQuantity,
            reportOnLeave                           BOOLEAN,
            hysteresis                              Hysteresis,
            timeToTrigger                           TimeToTrigger,
            useWhiteCellList                        BOOLEAN
        },
        eventA5                                 SEQUENCE {
            a5-Threshold1                           MeasTriggerQuantity,
            a5-Threshold2                           MeasTriggerQuantity,
            reportOnLeave                           BOOLEAN,
            hysteresis                              Hysteresis,
            timeToTrigger                           TimeToTrigger,
            useWhiteCellList                        BOOLEAN
        },
        eventA6                                 SEQUENCE {
            a6-Offset                               MeasTriggerQuantityOffset,
            reportOnLeave                           BOOLEAN,
            hysteresis                              Hysteresis,
            timeToTrigger                           TimeToTrigger,
            useWhiteCellList                        BOOLEAN
        },
        ... ,
        eventL1-r17                             SEQUENCE {
            distanceThresFromReference1-r17         FFS,
            distanceThresFromReference2-r17         FFS,
            referenceLocation1-r17                  ReferenceLocation-r17,
            referenceLocation2-r17                  ReferenceLocation-r17,
            hysteresis                              HysteresisLocation-r17,
        }
    },
    rsType                                  NR-RS-Type,
    reportInterval                          ReportInterval,
    reportAmount                            ENUMERATED {r1, r2, r4, r8, r16, r32, r64, infinity},
```

```
        reportQuantityCell                      MeasReportQuantity,
        maxReportCells                          INTEGER (1..maxCellReport),
        reportQuantityRS-Indexes                MeasReportQuantity
OPTIONAL,      -- Need R
        maxNrofRS-IndexesToReport               INTEGER (1..maxNrofIndexesToReport)
OPTIONAL,      -- Need R
        includeBeamMeasurements                 BOOLEAN,
        reportAddNeighMeas                      ENUMERATED {setup}
OPTIONAL,      -- Need R
        [...]
        includeCommonLocationInfo-r16           ENUMERATED {true}
OPTIONAL,      -- Need R
        [...]
}

[...]

NR-RS-Type ::=                                  ENUMERATED {ssb, csi-rs}

MeasTriggerQuantity ::=                         CHOICE {
        rsrp                                        RSRP-Range,
        rsrq                                        RSRQ-Range,
        sinr                                        SINR-Range
}

MeasTriggerQuantityOffset ::=                   CHOICE {
        rsrp                                        INTEGER (-30..30),
        rsrq                                        INTEGER (-30..30),
        sinr                                        INTEGER (-30..30)
}

MeasReportQuantity ::=                          SEQUENCE {
        rsrp                                        BOOLEAN,
        rsrq                                        BOOLEAN,
        sinr                                        BOOLEAN
}

[...]

distanceFromReference                           FFS
}

ReferenceLocation-r17           ::=             TypeFFS,
```

| *CondTriggerConfig* field descriptions |
|---|
| *a3-Offset* <br> Offset value(s) to be used in NR conditional reconfiguration triggering condition for cond event a3. The actual value is field value * 0.5 dB. |
| *a5-Threshold1/ a5-Threshold2* <br> Threshold value associated to the selected trigger quantity (e.g. RSRP, RSRQ, SINR) per RS Type (e.g. SS/PBCH block, CSI-RS) to be used in NR conditional reconfiguration triggering condition for cond event a5. In the same *condeventA5*, the network configures the same quantity for the *MeasTriggerQuantity* of the *a5-Threshold1* and for the *MeasTriggerQuantity* of the *a5-Threshold2*. |
| *condEventId* <br> Choice of NR conditional reconfiguration event triggered criteria. |
| *referenceLocation1, referenceLocation2* <br> Reference locations used for location based event. The *referenceLocation1* is associated to serving cell and *referenceLocation2* is associated to candidate target cell. |
| *timeToTrigger* <br> Time during which specific criteria for the event needs to be met in order to execute the conditional reconfiguration evaluation. |

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* Quotation End \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

The NTN status report including some agreements from 3GPP meetings is quoted as below ([6] RP-211774):

**************************************** Quotation Start [6] ****************************************

2.1 RAN1

2.1.1 Agreements

- RAN1#106-e, 16th– 27th August 2021, e-meeting

Agreement:

- The UE-specific K_offset can be provided and updated by network with MAC CE.

- FFS: UE can be provided and updated by network with a UE-specific K_offset in RRC reconfiguration o FFS: Details on whether and how the two solutions work together

[…]

The information of K_mac is carried in system information.

Agreement:

The unit of K_mac is number of slots for a given subcarrier spacing.

- FFS: one subcarrier spacing value or different subcarrier spacing values for different scenarios.

Agreement:

In the estimate of UE-gNB RTT, which is equal to the sum of UE's TA and K_mac, for delaying the starts of ra-ResponseWindow and msgB-ResponseWindow, the UE's TA is equal to $T_{TA} = (N_{TA} + N_{TA,UE-specific} + N_{TA,common} + N_{TA,offset}) \times T_c$ with $N_{TA} = 0$.

[...]

- A validity duration configured by the network for satellite ephemeris data indicates the maximum time during which the UE can apply the satellite ephemeris without having acquired new satellite ephemeris.

o FFS: Associated UE behaviour if the UE does not read the ephemeris within the validity duration.

- FFS: Whether the same validity duration can be applied for Common TA.

[...]

Working assumption:

Common TA may include parameter(s) indicating timing drift.

- The UE will apply common TA according to the parameters provided by the network (if any). No offset between the common TA according to the parameters provided by the network and the actual feeder link RTT is considered when defining UE UL timing error requirements.

[...]

2.2 RAN2

2.2.1 Agreements

The RAN2 work plan described in R2-2107146 should be considered as a basis for work.

- RAN2#115-e, 9th – 27th August 2021, e-meeting

[...]

1. Broadcast of cell stop time in SIB is only applicable to quasi earth fixed cell (not to moving cell). No further work in this release to address any moving cell specific details on using the cell stop time to assist measurements or cell reselection 2. For quasi-earth fixed cell, the reference location of the cell (serving cell or the neighbor cells) is broadcast in system information 1. For quasi-earth fixed cell, UE should start measurements on neighbour cells before the serving cell stops covering the current area.

2. For quasi-earth fixed cell, the broadcast "timing information on when a cell is going to stop serving the area" refers to the time when a cell stops covering the current area.

3. For quasi-earth fixed cell, specify that UE should start measurements on neighbour cells before the broadcast stop time of the serving cell, i.e. the time when the serving cell stops covering the current area, and the exact time to start measurements is up to UE implementation.

Working Assumption: Location assisted cell reselection, with the distance between UE and the reference location of the cell (serving cell and/or neighbor cell) taken into account, is supported for quasi-earth fixed cell, if UE has valid location information, which means location acquisition will not be triggered at UE side only for location assisted cell reselection. FFS on the details.

Working Assumptions: Combination of serving and target cell reference location is supported for location report trigger event and for CHO location trigger Working Assumptions: Specify that measurement reports can be configured to be piggybacked with location report when location based event triggers it 1. The following event is supported: condEvent L4: Distance between UE and the PCell's reference location becomes larger than absolute threshold1 AND the distance between UE and the Conditional reconfiguration candidate becomes shorter than absolute threshold2.

FFS other options

2. Specify hysteresis and time to trigger for the location event for RRM and CHO 3. Timing information from RRCReconfiguration message in RRC running CR is removed 4. UE is allowed to perform HO only during T1 to T2

5. Agree to limit to A or B and continue discussion between options A and B

Option A: UTC time + duration/timer, e.g. 00:00:01 + 40s

Option B: Two UTC time to indicate the start (T1) and end time (T2) of the candidate cell, e.g. 00:00:01 + 00:00:41

1. RAN2 adopts Option 1: UTC time + duration/timer, e.g. 00:00:01 + 40s for representing T1 and T2 for CHO time event.

2. RAN2 adopts options C: location and RRM and D: time and RRM to be configuration options for CHO

[...]

1. If SA3 has no concern reporting coarse location during initial access, the coarse location information is reported in Msg5, i.e., via RRCSetupComplete/RRCResumeComplete message.

2. For coarse UE location reporting during initial access, the location granularity is not indicated to UE via SIB 3. Enhancements to validate the UE's coarse location information is not needed from RAN2 perspective. Whether this is needed by the network is up to other WGs.

4. After AS security is established, gNB can obtain a GNSS-based location information from the UE using existing signalling method, i.e., by configuring includeCommonLocationInfo in the corresponding reportConfig. It is up to SA3 to decide whether User Consent is required before NW acquires location information from the UE in NTN. RAN2 discuss whether to send LS to SA3

5. Aperiodic location reporting (e.g., via DCI) is not supported.

Working assumption: Event triggered-based UE location reporting are configured by gNB to obtain UE location update of mobile UEs in RRC_CONNECTED 1. Send new LS to SA3 for the need of NTN specific user consent for obtaining UE location by gNB."

1. If accepted by SA3, if the gNB has user consent to obtain UE location in NTN, reporting of finer location information/full GNSS coordinates in RRC_CONNECTED can be supported after AS security is enabled

********************************** Quotation End **********************************

Terrestrial networks (TN) provide mobile services via base station on the ground. Different from TN, non-terrestrial networks (NTN) are to be introduced in New Radio (NR) to use an airborne/spaceborne vehicle as platform for providing mobile services (e.g., [1] RP-211256). A User Equipment (UE) may link to, camp on, and/or connect to the NTN network that involves airborne/spaceborne for transmission. NTN comprises various platforms, including low earth orbiting (LEO) satellite, medium earth orbiting (MEO) satellite, highly elliptical orbiting (HEO) satellite, geostationary earth orbiting (GEO) satellite, geostationary synchronous Orbit (GSO) satellite, non-geostationary synchronous orbit (NGSO) satellite, and/or high altitude platform station (HAPS). According to [2] 3GPP TR 38.821 V16.1.0, NTN may be defined as a network (or segment of a network) using an airborne or space-borne vehicle (e.g., satellite) to embark a transmission equipment relay node or base station.

NTN could offer a wide-area coverage and provide network (NW) access in the scenario when TN is unfeasible (e.g., desert, polar area, and/or on an airplane). However, for the long distance from UE to the platform(s), the transmission between UE and NW in NTN needs a longer round-trip time (RTT) than the transmission in TN.

In general, NTN and TN have different characteristics. For example, propagation delay (or round-trip delay) in NTN is longer than the propagation delay (or round-trip delay) in TN. In addition, different NTN platforms could have different characteristics. For example, the propagation delay (or round-trip delay) is shorter in LEO (or NGSO) satellite than in GEO satellite, while the cell coverage is larger in GEO satellite than in LEO (or NGSO) satellite. For example, a LEO (or NGSO) satellite could have an earth-fixed cell or an earth-moving cell. A LEO based earth-fixed cell could have an earth-fixed beam (e.g., the beam is temporarily fixed on a location during a time period). A LEO based earth-moving cell could have an earth-moving beam (e.g., the beam is continuously moving along with the satellite). More details regarding different NTN platforms could be found in [2] 3GPP TR 38.821 V16.1.0.

NTN and TN are two different network types. NTN may also be divided into various NTN types (or called platform types, Radio Access Technology (RAT) types) such as LEO (e.g., earth-moving cell, earth-fixed cell), MEO, GEO, NGSO, HEO, or HAPS. NGSO (or NGEO) could include a NTN type other than GEO. Different network types (e.g., NTN, TN) and/or NTN types (e.g., GEO, NGSO) may have different characteristics such as coverage, propagation delay, Quality of Service (QoS) provision, or beamforming capability. It should be possible that cells of different network types and/or NTN types are overlapped in geographic areas.

Figure 6:
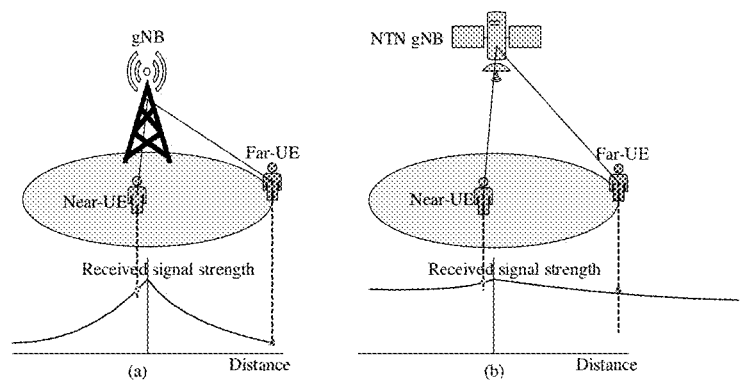
FIG. 6 is an illustration of near-far effect in different Terrestrial Network and NTN scenarios, in accordance with embodiments of the present invention.

In NTN, due to the longer distance between the UE and the satellite, the signaling strength variation becomes less significant as compared to the case in TN, as illustrated in FIG. 6 (which is from FIG. 7.3.2.1.3-1 of [2] 3GPP TR 38.821 V16.1.0). The legacy mechanisms for cell reselection, intra-frequency measurements, conditional handover (CHO) and/or measurement report based on radio condition related measured result (e.g., Reference Signal Received Power (RSRP)/Reference Signal Received Quality (RSRQ) of the serving cell and/or neighbor cell) may thus be less accurate and/or less reliable, and mobility problems (e.g., too early handover, too late handover, wrong cell handover and/or cell reselection) may occur and result in service interruption.

Location information of the serving cell and/or the neighbor cell (or a candidate cell), together with the UE location, may thus be utilized to facilitate the cell reselection, intra-frequency measurements, CHO and/or measurement reporting procedure. A location-based measurement (report triggering) event could be defined. When the location-based event (e.g., entry condition of the event, and/or leaving condition of the event) is fulfilled, cell reselection, intra-frequency measurements, CHO and/or a measurement report could be triggered by the UE. The measurement report could include the latest measurement result(s) of the UE. The location-based event is used by the UE to (determine whether to) trigger CHO, measurement report, cell reselection, and/or intra-frequency measurements.

The "location-based measurement event" could be referred to, supplemented by, and/or replaced by "location-based event" and/or "location-based measurement". The location-based event could be configured, performed, evaluated, and/or executed in Radio Resource Control (RRC) idle/inactive mode. The location-based event could be configured, performed, evaluated, and/or executed in RRC connected mode.

A first location-based (measurement) event may be triggered by (or based on) the distance between the UE and a reference location (e.g., cell center) of a serving cell (or a candidate cell). For example, if the UE detects that the distance between the UE and the reference location of the serving cell (or the candidate cell) becomes larger than a first threshold (e.g., provided in the configuration of the first location-based measurement event), the UE may consider (the entering condition for) this first location-based event to be satisfied (for this serving cell or candidate cell). Alternatively and/or additionally, if the UE detects that the distance between the UE and the reference location of the serving cell (or a candidate cell) becomes smaller than the first threshold, the UE may consider (the leaving condition for) this first location-based event to be satisfied (for this serving cell or candidate cell). Alternatively and/or additionally, if the UE detects that the distance between the UE and the reference location of the serving cell (or a candidate cell) becomes smaller than the first threshold, the UE may consider (the leaving condition for) this first location-based event to be not satisfied (for this serving cell or candidate cell).

A second location-based (measurement) event may be triggered by (or based on) the distance between the UE and a reference location (e.g., cell center) of a neighbor cell (or a candidate cell). For example, if the UE detects that the distance between the UE and the reference location of the neighbor cell (or the candidate cell) becomes smaller than a second threshold (e.g., provided in the configuration of the second location-based measurement event), the UE may consider (the entering condition for) this second location-based event to be satisfied (for this neighbor cell or candidate cell). Alternatively and/or additionally, if the UE detects that the distance between the UE and the reference location (e.g., cell center) of the neighbor cell (or a candidate cell) becomes larger than the second threshold, the UE may consider (the leaving condition for) this second location-based event to be satisfied (for this neighbor cell or candidate cell).

The reference location of a cell may be geographic location of the cell. The reference location of a cell may be the cell center (e.g., on the ground). The reference location of a cell may be a virtual location defined by the network (e.g., the geographical area is split into rectangular grids and the reference location is represented by indices of the grid).

The location-based (measurement) event(s) may be triggered by (or be based on, or be) at least one or more of the following conditions:

the distance between the UE and reference location of the serving cell (or candidate cell) becomes below a threshold;

the distance between the UE and reference location of the serving cell (or candidate cell) becomes above a threshold;

the distance between the UE and reference location of a neighbor cell (or candidate cell) becomes amount of offset below the distance between the UE and reference location of the primary cell (PCell) (or primary serving cell (PSCell), or serving cell);

the distance between the UE and reference location of a neighbor cell (or candidate cell) becomes below a threshold;

the distance between the UE and reference location of the PCell (or PSCell, or serving cell) becomes above a threshold and the distance between the UE and reference location of a neighbor cell (or candidate cell) and/or SCell becomes below another threshold;

the distance between the UE and reference location of a neighbor cell (or candidate cell) becomes amount of offset below the distance between the UE and reference location of the SCell (or serving cell).

When (at least) one or more of the above conditions (for location-based event) is fulfilled, the UE may determine to trigger a measurement report, to initiate/trigger CHO (execution), to trigger cell reselection, and/or to perform intra-frequency measurements. When (at least) one or more of above conditions (for location-based event) is fulfilled, the UE may determine not to perform intra-frequency measurements. The UE may determine whether to trigger, initiate, and/or perform a measurement report, CHO (execution), cell reselection, and/or intra-frequency measurements based on the UE's location and/or radio condition. The UE may determine whether to trigger, initiate, and/or perform a measurement report, CHO (execution), cell reselection, and/or intra-frequency measurements considering both location-based events and radio condition based events.

In current NR RRC (e.g., [3] 3GPP TS 38.331 V16.5.0), several measurement events based on radio condition (e.g., RSRP, RSRQ) has been defined. The radio condition-based events could include one or more of the following:

Event A1: the radio condition of a serving cell becomes better than a threshold;

Event A2: the radio condition of a serving cell becomes worse than a threshold;

(Cond)Event A3: the radio condition of a neighbor cell (or candidate cell) becomes amount of offset better than the PCell (or PSCell);

(Cond)Event A4: the radio condition of a neighbor cell (or candidate cell) becomes better than a threshold;

(Cond)Event A5: the radio condition of PCell (or PSCell, or serving cell) becomes worse than a threshold and the radio condition of a neighbor (or candidate cell) and/or SCell becomes better than another threshold;

Event A6: the radio condition of a neighbor cell (or candidate cell) becomes amount of offset better than the radio condition of a SCell;

Event B1: the radio condition of an inter-RAT neighbor cell becomes better than a threshold;

Event B2: the radio condition of PCell becomes worse than a threshold and the radio condition of an inter-RAT neighbor cell becomes better than another threshold.

Combinations of different types of measurement events may be possible. For example, a measurement event could be based on both the location information and the signaling strength. For example, a measurement event could be defined by combining one of the legacy measurement events (e.g., event A1, A2, A3, A4, A5, and/or A6) and one of the location-based measurement events as described above. In this case, the UE considers the entering condition to be satisfied when the entering conditions of the combined two events are both satisfied, and the UE considers the leaving condition to be satisfied when the leaving conditions of the combined two events are both satisfied.

The "measurement event" may be referred to, supplement by, and/or replaced by "event" and/or "measurement". The measurement event may be configured, performed, evaluated, and/or executed in RRC idle/inactive mode. The measurement event may be configured, performed, evaluated, and/or executed in RRC connected mode. The measurement event may be used for CHO, measurement report, cell reselection, and/or intra-frequency measurements. The measurement event may be based on the UE's location and cell reference location. The measurement event could be based on radio condition. The measurement event may be and/or comprise location-based events and/or radio condition-based events. The event may be one of the radio condition-based events described above (e.g., event A1, A2, A3, A4, A5, A6). The event may be one of the location-based events described above (e.g., based on that distance to the serving cell becomes above or below a threshold).

For the case of conditional handover, if the UE considers the entry condition for a measurement event is satisfied for a cell (e.g., candidate cell), the UE could apply a stored (or configured, or preconfigured) handover command (e.g., condRRCReconfig) to initiate a handover (e.g., RRC reconfiguration with sync) procedure toward the candidate cell (as a target cell). For the case of measurement report, if the UE considers the entering condition for a measurement event is satisfied for a cell, the UE could include the cell in a list (e.g., cellsTriggeredList). If the UE considers the leaving condition for a measurement event is satisfied for a cell, the UE could remove the cell from a list (e.g., cellsTriggeredList). The UE could initiate a measurement reporting procedure if the entering condition for a measurement event is satisfied. The UE may initiate a measurement reporting procedure if the leaving condition for a measurement event is satisfied. "Satisfied" as described above could mean that the condition is (continuously) satisfied during a configurable timer period (e.g., timeToTrigger).

For the case of intra-frequency measurements, if the UE considers the condition for a measurement event is satisfied for a cell (e.g., serving cell), the UE may not perform intra-frequency measurements. If the UE considers the condition for a measurement event is not satisfied for a cell (e.g., serving cell), the UE may perform intra-frequency measurements.

For the case of cell reselection, if the UE considers the condition for a measurement event is satisfied for a cell (e.g., neighbor cell), the UE may reselect to the cell (e.g., neighbor cell) and/or camp to the cell (e.g., neighbor cell).

The serving cell may be a special cell (SpCell) of the UE. The serving cell may be a secondary cell (SCell) of the UE. The neighbor cell may be one of a plurality of neighbor cells of the UE.

A UE evaluates a location-based event based on reference location of a cell. In order to evaluate whether to trigger a CHO, measurement report, cell reselection, and/or intra-frequency measurements by a location-based event for a cell (e.g., a candidate cell), the UE needs to know the reference location of the cell. The UE acquires the information of cell reference location (e.g., for a candidate cell, serving cell and/or neighbor cell) from network. The information of cell reference location could be provided by system information and/or a dedicated signaling, e.g., RRC message.

The location-based event is useful for a NTN cell, especially for a LEO based earth-moving cell. For a LEO based earth-moving cell, the cell keeps moving on the ground, and thus the reference location of the cell is changing all the time. The information of cell reference location may be updated constantly. According to TR 38.821 (e.g., [2] 3GPP TR 38.821 V16.1.0), the ground speed of a LEO satellite may be as high as 7.56 km/s.

If the information of cell reference location is not updated often enough, the UE would use the out-of-date information to evaluate a location-based event. It could result in inaccurate conditional handover (or measurement report) and mobility problems (e.g., too early handover, too late handover). On the other hand, if the information of cell reference location is updated too often, it causes unnecessary signaling overhead (e.g., in the Downlink (DL)) and UE power waste (e.g., for the unnecessary update).

To solve the issue, assistance information is provided to a UE. The assistance information may be related to reference location of a cell (e.g., a serving cell, neighbor cell, and/or candidate cell). The assistance information is provided by a network node (e.g., Next Generation NodeB (gNB), Next Generation Radio Access Network (NG-RAN) node). The UE may receive the assistance information from the network node (e.g., in system information and/or a RRC message). The UE may receive information of reference location of a cell from the network node (e.g., in system information and/or a RRC message). The assistance information may be associated with the cell.

The UE may use at least the assistance information to derive (or update) a reference location of a cell. Alternatively and/or additionally, the UE may use at least the assistance information to derive (or update) a new reference location of a cell, e.g., from an old reference location of the cell.

The UE may use at least the assistance information to validate the information of reference location of the cell. For example, the UE may use at least the assistance information to evaluate whether the last provided information of reference location of the cell is valid, e.g., in the meantime. For example, if the cell reference location is not valid (e.g., out-of-date), the UE may derive (or update) a new reference location of the cell based on at least the assistance information.

The UE may use (or determine whether to use) the assistance information when the UE evaluates a location-based measurement event, e.g., for a candidate cell, neighbor cell, and/or serving cell. The UE may use (or determine whether to use) the assistance information when the UE evaluates whether to trigger a conditional handover (or a measurement report), e.g., for a candidate cell. The UE may use (or determine whether to use) the assistance information (e.g., validity duration) upon configuring with and/or receiving the assistance information.

The UE may use (or determine whether to use) the assistance information when the UE requires a reference location of a cell. The UE may store information of reference location of the cell in response to acquiring the information of reference location of the cell. The UE may use the assistance information when the stored information of reference location of the cell is not valid (e.g., out-of-date), e.g., based on the assistance information.

The assistance information (for a cell) may be provided in addition to the information of reference location (of the cell). The assistance information (for a cell) may be provided along with the information of reference location (of the cell). The assistance information (for a cell) may be provided separately from the information of reference location (of the cell).

The assistance information may be provided in system information. The assistance information may be provided in a dedicated signaling, e.g., RRC message, RRC reconfiguration.

The assistance information (for a cell) may include (or can be used to derive) one or more of the following information (or related to the information):

Direction:
  The assistance information may indicate the direction that the cell (e.g., the reference location of the cell) is moving (e.g., north, south, east, west, N degrees).
  The assistance information may indicate where (e.g., which direction) the cell (e.g., the reference location of the cell) is heading for (e.g., north, south, east, west, N degrees).

Velocity/Speed:
  The assistance information may indicate how fast the cell (e.g., the reference location of the cell) is moving (e.g., m/s, km/hr).

Time Stamp:
  The assistance information may be associated with a specific reference location of the cell, e.g., the reference location provided together with the assistance information.
  The assistance information may indicate the time when the cell (e.g., the reference location of the cell) is located in the associated reference location.
  The assistance information may be in the form of Coordinated Universal Time (UTC) time, e.g., YYMMD-Dhhmmss.

Validity Time:
  The assistance information may be associated with a specific reference location of the cell, e.g., the reference location provided together with the assistance information. The assistance information and the reference location may be indicated/associated with same cell ID.
  The assistance information may indicate (or is used to derive) when the associated reference location is considered as valid (or invalid).
  The assistance information may indicate (or is used to derive) how long the associated reference location is considered as valid.
  The assistance information may indicate (or is used to derive) the time (or a time period) after which the associated reference location is considered as invalid.

Ephemeris (or Information Related to Ephemeris):
  The assistance information may indicate the location of a satellite associated with the cell.
  The assistance information may include orbital plane parameter(s) (e.g., square root of semi-major axis, eccentricity, inclination angle at reference time, longitude of ascending node of orbit plane, argument of perigee) ([2] 3GPP TR 38.821 V16.1.0).
  The assistance information may include satellite level parameter(s) (e.g., mean anomaly at reference time, ephemeris reference time) ([2] 3GPP TR 38.821 V16.1.0).

Function (and/or Input Parameter(s) of the Function) Related to Cell Movement:
  The assistance information may be used to calculate/derive the cell reference location. It may be a function of time. The assistance information may be associated to a cell. The function may indicate the movement of the cell.

Uncertainty Factor:
  The assistance information may indicate a UE about the uncertainty of the cell reference location. The UE may determine the time it acquires/derives a new cell reference location-based on the assistance information. The uncertainty factor may be in unit of distance (e.g., centimeter, meter, kilometer). The uncertainty factor may be in unit of time (e.g., second, minute, hour)

In an example, the UE receives information of a reference location of a cell. The UE receives information of time stamp and/or validity time associated with the information of the reference location of the cell. The UE derives (or calculates) a time period between the current time and/or the time stamp. The UE acquires, derives, and/or updates a new reference location of the cell before or upon the time period expires. The UE starts or restarts a timer with the length of the validity time. The UE acquires, derives, and/or updates a new reference location of the cell before or upon the timer expiry. The UE uses the new cell reference location of a cell to evaluate a location-based event, e.g., for cell reselection, intra-frequency measurements, CHO, and/or measurement report.

In an example, the UE receives information of a reference location of a cell. The UE receives information of velocity. The UE derives (or calculates) the distance that the cell moves during the time period based on the information of velocity. The UE receives information of direction. The UE derives (or calculates) a new reference location-based on the direction, distance, and/or the original reference location of the cell. The UE uses the new reference location to evaluate a location-based event, e.g., for cell reselection, intra-frequency measurements, CHO, and/or measurement report.

In an example, the UE receives information of a reference location of a cell. The UE receives ephemeris information of a satellite associated with the cell. The UE derives a new reference location-based on the original reference location and/or the ephemeris information. The UE uses the new reference location to evaluate a location-based event, e.g., for intra-frequency measurements, CHO, and/or measurement report.

The information of reference location of a cell may be geographic location (on the ground) of the cell. The information of reference location of the cell may be in the form of location coordinate (e.g., X-coordinate, Y-coordinate, Z-coordinate). The reference location of a cell may be/indicate/describe the cell center. The reference location of a cell may be/indicate/describe a region/area (on the ground) covering the cell center.

With the assistance information, the information of reference location of a cell could be updated less frequently. The information of reference location of the cell doesn't need to be updated whenever the cell moves. With the assistance information, the UE could acquire the information of reference location of the cell less frequently. With the assistance information, the UE could acquire the information of reference location of the cell without RRC reconfiguration procedure. The UE doesn't need to acquire the information of reference location of the cell every time the UE needs to use a reference location of the cell. Reference location of the cell could be provided by the network directly, e.g., via the information of reference location of the cell. Reference location of the cell could also be derived by the UE, e.g., based on the assistance information.

To solve the issue, the usage of a location-based event and/or the information of cell reference location may be applied with some limitation. For example, the location-based event and/or the information of cell reference location may not be applied (or applicable) to a (LEO) earth-moving cell. A (LEO) earth-moving cell may not be able to provide the information of cell reference location to a UE. A (LEO) earth-moving cell may not be able to configure a location-based event to a UE.

The UE could not apply, evaluate and/or perform a location-based event for an earth-moving cell (e.g., based on the assistance information). The network could not configure a location-based event for an earth-moving cell. A location-based event would not be applied to an earth-moving cell. The reference location may not be provided in a RRC message (e.g., RRCReconfiguration) for an earth-moving cell. The reference location provided in a RRC message (e.g., RRCReconfiguration) may be omitted by the UE for an earth-moving cell. The reference location provided in a RRC message (e.g., RRCReconfiguration) may not be used by the UE for an earth-moving cell.

The location-based event may not be provided in a RRC message (e.g., RRCReconfiguration) for an earth-moving cell. The location-based event provided and/or configured in a RRC message (e.g., RRCReconfiguration) may be omitted by the UE for an earth-moving cell. The location-based event provided and/or configured in a RRC message (e.g., RRCReconfiguration) may not be used by the UE for an earth-moving cell.

The UE may not receive configuration of location-based event for an earth-moving cell. The UE may not be configured with location-based event for an earth-moving cell. The configuration may be a distance threshold, reference location of a cell, condEventD1, and/or eventD1. The configuration may be associated with CHO, and/or measurement report. The UE may not apply, execute, and/or evaluate a location-based event (e.g., condEventD1, eventD1) for an earth-moving cell.

The UE may receive configuration of location-based event and/or assistance information (e.g., ephemeris) for a cell. The UE may recognize/determine the cell type based on the assistance information. The UE may recognize/determine the cell as an earth-moving cell based on the assistance information. The UE may not apply, execute, and/or evaluate a location-based event (e.g., condEventD1, eventD1) for an earth-moving cell based on the assistance information.

The location-based event and/or the information of cell reference location may be applicable to a (NTN/LEO) earth-fixed cell. The location-based event and/or the information of cell reference location may be applicable to a (NTN/LEO) earth-moving cell. The location-based event and/or the information of cell reference location may be applicable to a NTN/GEO cell.

The terms "cell reference location", "reference location of a cell", and "information of cell reference location" may be used interchangeably.

The cell may be a NTN cell. The cell may be a LEO cell. The cell may be a GEO cell. The cell may be a NGSO cell. The cell may be an earth-moving cell. The cell may be an earth-fixed cell. The cell may be a quasi-earth-fixed cell.

The cell may be a candidate cell. The candidate cell may not be a serving cell of the UE. The candidate cell may be configured (or indicated) by a network.

The cell may be a serving cell of the UE. The serving cell may be a PCell. The serving cell may be a SpCell. The serving cell may be a SCell.

The cell may be a neighbor cell of the UE. The neighbor cell may be an intra-frequency neighbor cell. The neighbor cell may be an inter-frequency neighbor cell. The neighbor cell may be an inter-RAT neighbor cell.

The serving cells may be associated to a measurement object (e.g., measObjectNR ([4] R2-2106541)). The measurement object (e.g., measObjectNR ([4] R2-2106541)) may be frequency/time location and subcarrier spacing of reference signals to be measured (e.g., for inter-frequency and inter-frequency measurement). The measurement object (e.g., measObjectNR ([4] R2-2106541)) may be a carrier frequency or a frequency band.

A serving cell considered (or applicable) in an event implies that the measurement result of the serving cell is taken into account for the evaluation of the event as a serving cell.

Location information (e.g., reference location) of the serving cell may be available to the UE. Location information (e.g., reference location) of the serving cell may be not available to the UE.

The serving cell(s) (and/or neighbor cell(s)) may be of a specific network type, e.g., NTN.

The serving cell(s) (and/or neighbor cell(s)) may be of a specific NTN type (or platform type), e.g., LEO, MEO, GEO, NGEO, HAPS.

The serving cell(s) (and/or neighbor cell(s)) may be of a specific beam type, e.g., earth moving, earth fixed, quasi earth fixed (e.g., the beam is temporarily fixed at a location during a time period and is temporarily fixed at another location during another time period).

The serving cell(s) (and/or neighbor cell(s)) may include only one cell. The serving cell(s) (and/or neighbor cell(s)) may include multiple cells.

The specific serving cell mentioned above may be at least one or more of the above (or combination of the above).

The terms "measurement report triggering event", "measurement event", and "event" may be used interchangeably.

The terms "valid duration", "validity duration" and/or "validity time" may be used interchangeably.

The measurement event may involve serving cell(s). The measurement event may not involve neighbor cell(s). The measurement event may involve neighbor cell(s). The measurement event may not involve serving cell(s). The measurement event may involve serving cell(s) and neighbor cell(s).

The measurement event may be for intra-frequency measurements. The measurement event may be for inter-frequency measurement. The measurement event may be for intra-NR measurement. The measurement event may be for inter-RAT measurement.

The measurement event may be not for inter-frequency measurement. The measurement event may be not for inter-RAT measurement. The measurement event may be not for sidelink measurement (e.g., event C1, C2 ([4] R2-2106541)). The measurement event may be not an interference-based event (e.g., event I1 ([4] R2-2106541)).

The specific event mentioned above may be at least one or more of the above (or combination of the above).

A measurement report (e.g., measResults) could be associated with a measurement report configuration, based on a measurement Identity (e.g., measId). A measurement report (e.g., measResults) could be associated with a measurement Identity (e.g., measId). A measurement report configuration could be associated with a measurement Identity (e.g., measId).

The measurement may be with respect to Synchronization Signal Block (SSB). Alternatively and/or additionally, the measurement may be with respect to Channel State Information Reference Signal (CSI-RS).

The UE may be configured with multi-connectivity. The UE may be configured with carrier aggregation. The UE may be configured with dual connectivity. The UE may be configured with multiple serving cells (e.g., in the same cell group, in different cell groups).

The UE may be in a cell of NTN. The UE may be connected to a cell of NTN. The UE may be in a cell of TN. The UE may be connected to a cell of TN.

The UE may be referred to the UE, or a Medium Access Control (MAC) entity of the UE, or a RRC entity of the UE.

The UE may be a NR device. The UE may be a NR-light device. The UE may be a reduced capability device. The UE may be a mobile phone. The UE may be a wearable device. The UE may be a sensor. The UE may be a stationary device.

The network may be a network node. The network may be a base station. The network may be an access point. The network may be an Evolved Node B (eNB). The network may be a gNB. The network may be a core network node, e.g., Access and Mobility Management Function (AMF), Session Management Function (SMF), User Plane Function (UPF).

Referring to FIG. 7, with this and other concepts, systems, and methods of the present invention, a method 1000 for a UE in a wireless communication system comprises receiving information of a first reference location of a cell (step 1002), receiving assistance information associated with the cell (step 1004), deriving a second reference location of the cell based on at least the assistance information (step 1006), and using the second reference location of the cell to evaluate a location-based measurement event (step 1008).

In various embodiments, the UE derives the second reference location of the cell based on the first reference location of the cell.

In various embodiments, the assistance information includes direction of the cell.

In various embodiments, the assistance information includes velocity of the cell.

In various embodiments, the assistance information includes a time stamp associated with the first reference location of the cell.

In various embodiments, the assistance information includes a validity time (or time period) associated with the first reference location of the cell.

In various embodiments, the assistance information includes ephemeris associated with the cell.

In various embodiments, the location-based measurement event is used for triggering a conditional handover (for the cell).

In various embodiments, the location-based measurement event is used for triggering a measurement report.

Referring back to FIGS. 3 and 4, in one or more embodiments from the perspective of a UE, the device 300 includes a program code 312 stored in memory 310 of the transmitter. The CPU 308 could execute program code 312 to: (i) receive information of a first reference location of a cell, (ii) receive assistance information associated with the cell, (iii) derive a second reference location of the cell based on at least the assistance information, and (iv) use the second reference location of the cell to evaluate a location-based measurement event. Moreover, the CPU 308 can execute the program code 312 to perform all of the described actions, steps, and methods described above, below, or otherwise herein.

Referring again back to FIGS. 3 and 4, in one or more embodiments from the perspective of a network, the device 300 includes a program code 312 stored in memory 310 of the transmitter. The CPU 308 could execute program code 312 to: (i) transmit information of a first reference location of a cell, (ii) transmit assistance information associated with the cell, (iii) wherein the UE derives a second reference location of the cell based on at least the assistance information, and (iv) wherein the UE uses the second reference location of the cell to evaluate a location-based measurement event. Moreover, the CPU 308 can execute the program code 312 to perform all of the described actions, steps, and methods described above, below, or otherwise herein.

A UE could be configured by the network to measure multiple beams of a cell to derive the cell quality. A UE could be configured by the network to measure the distance between the UE and a reference location (e.g., cell center) of a NTN cell. The (NTN) cell may be a serving cell and/or a neighbor cell. The UE would trigger a measurement report to send the measurement results (of radio condition and/or location) based on one or more triggering event. In addition, the network may determine whether to trigger a handover for the UE, e.g., based on a measurement report provided by the UE. A source RAN node which serves the UE (e.g., via a source cell) may prepare one or more target cells (which may belong to a target RAN node) for the UE, e.g., by transmitting a handover request to the target RAN node. The target RAN node may accept or reject the handover request. If the target RAN node accepts the handover request, the source RAN node may generate and transmit a handover command to the UE. In response to receiving the handover command, the UE performs a handover procedure and changes its serving cell from the source cell to the target cell. The source RAN node may also provide a configuration of conditional handover to the UE. In response to receiving the configuration of conditional handover, the UE evaluates whether one or more conditions for the configured conditional handover is fulfilled. If the condition is fulfilled, the UE initiates a handover procedure and changes its serving cell from the source cell to a candidate cell. The target cell and/or candidate cell may be one of the neighbor cells.

The triggering event for measurement (report) and/or condition for configured conditional handover in NTN may relate to radio condition, UE location (e.g., distance to a cell), and/or time (e.g., a time duration). More details of the (conditional) handover and measurement (report) for NTN can be found in TS 38.331 (e.g., 3GPP TS 38.331 V16.5.0) and a NTN running Cognitive Radio (CR) (e.g., [5] draft R2-2110710 V13). In addition, it was agreed by RAN2 that, for quasi-earth fixed cells, the reference location of the cell (serving cell or the neighbor cells) is broadcast in system information (e.g., [6] RP-211774). The reference location of a cell would be used by the UE to evaluate measurement report (e.g., location-based measurement report), cell (re) selection (e.g., location-based cell reselection, intra-frequency measurements), and/or CHO (e.g., location-based CHO) in NTN.

On the other hand, it was agreed by RAN1 that the following parameters should be broadcasted (e.g., in system information) to the UE:
  serving satellite ephemeris;
  common Timing Advance (TA) related parameters (e.g., $K\_mac$, $N_{TA}$, $N_{TA,common}$, $N_{TA,offset}$, $T_c$), which contain information for deriving/calculating the common TA for each UL transmission. The common TA related parameters include a network controlled common TA. In addition, the common TA related parameters may include other parameters which are still under RAN1 discussion.

RAN1 has also agreed to have a validity duration for satellite ephemeris data (e.g., [6] RP-211774). The duration is configured by the network and it indicates the maximum time duration in which the UE can apply the satellite ephemeris without having acquired new satellite ephemeris. If serving satellite ephemeris and common TA related parameters are signaled in the same System Information Block (SIB) message, the validity duration would be also used for common TA related parameters. Whether this validity duration can be applied for broadcast period are still under RAN1 discussion.

To measure the distance to a cell, the UE would acquire the reference location of one or more cells from the network (e.g., via system information). However, the NTN platform (e.g., LEO) as well as the cells belonging to the NTN platform (e.g., LEO) may move from time to time. Some broadcast information including the reference location of one or more cells may thus become invalid after acquired for a period of time, e.g., due to the satellite movement. The network may need to broadcast several assistance information to validate each of the information related to a NTN platform and/or NTN cell.

In one method, each broadcast information may require corresponding assistance information for the validation, e.g., validity duration. However, it may cause significant signaling overhead, and thus some optimization should be beneficial.

One concept of the invention is that one validity duration (e.g., a single information) could be associated to both the satellite ephemeris and the cell reference location. The same validity duration could be shared by the satellite ephemeris and the cell reference location. The validity duration may indicate the maximum time duration in which the UE applies the satellite ephemeris (without having acquired new satellite ephemeris) and the maximum time duration in which the UE applies the cell reference location (without having acquired new cell reference location). The same validity duration may also be shared by the common TA related parameters.

The cell reference location may be considered as valid if the associated satellite ephemeris is valid. The cell reference location may be considered as invalid if the associated satellite ephemeris is invalid. The associated satellite ephemeris may be valid if the associated validity duration has not expired, e.g., a timer with the length of validity duration is running. The associated satellite ephemeris may be invalid if the associated validity duration has expired, e.g., the timer is not running or has expired. A cell reference location may be associated to a satellite ephemeris if the cell is associated (or belong) to the satellite.

Alternatively and/or additionally, one validity duration could be associated to both the common TA related parameter(s) and the cell reference location. The same validity duration could be shared by the common TA related parameter(s) and the cell reference location. The validity duration may indicate the maximum time duration in which the UE applies the common TA related parameter(s) (without having acquired new common TA related parameter(s)) and the maximum time duration in which the UE applies the cell reference location (without having acquired new cell reference location).

The cell reference location may be considered as valid if the associated common TA related parameter(s) is valid. The cell reference location may be considered as invalid if the associated common TA related parameter(s) is invalid. The associated common TA related parameter(s) may be valid if the associated validity duration has not expired (e.g., the timer is running). The associated common TA related parameter(s) may be invalid if the associated validity duration has expired (e.g., the timer is not running or has expired). The cell reference location may be associated to the common TA related parameter(s) if the cell is a serving cell (e.g., PCell) of the UE.

The (information of) validity duration may be configured by a network. The (information of) validity duration may be broadcasted in system information. A UE may acquire the (information of) validity duration by system information. The (information of) validity duration may be preconfigured. The (information of) validity duration may be configured in a RRC signaling (e.g., dedicated RRC signaling, RRC reconfiguration).

The (information of) validity duration may indicate the maximum time duration in which the UE can apply the satellite ephemeris (without having acquired new satellite ephemeris). The (information of) validity duration may indicate the maximum time duration in which the UE can apply the cell reference location (without having acquired new cell reference location). The (information of) validity duration may indicate the maximum time duration in which the UE can apply the common TA related parameter(s) (without having acquired new common TA related parameter(s)). The validity duration may be represented by a timer (e.g., NTN ephemeris validity timer). The validity duration may be the time duration when a timer (e.g., NTN ephemeris validity timer) is running. The timer (e.g., NTN ephemeris validity timer) may be started and/or restarted with the validity duration. The validity duration may be configured as a parameter (e.g., in unit of symbols, slots, milliseconds, sub-milliseconds, seconds, period).

The (information of) (or related to) satellite ephemeris may be provided by a NW. The (information of) (or related to) satellite ephemeris may be broadcasted in system information. A UE may acquire the (information of) (or related to) satellite ephemeris by system information. The (information of) (or related to) satellite ephemeris may be preconfigured. The (information of) (or related to) satellite ephemeris may be configured in a RRC signaling (e.g., dedicated RRC signaling, RRC reconfiguration). The (information of) (or related to) satellite ephemeris may be stored in USIM. Multiple information may be used to derive the satellite ephemeris.

The (information of) (or related to) satellite ephemeris may be associated to at least a serving cell of the UE. The (information of) (or related to) satellite ephemeris may be associated to at least a neighbor cell of the UE. The neighbor cell may belong to the same satellite as the serving cell. The neighbor cell may belong to a different satellite from the serving cell.

The (information of) (or related to) satellite ephemeris may be used by the UE to derive UE specific TA. The (information of) (or related to) satellite ephemeris may be used by the UE to evaluate cell (re)selection (e.g., ephemeris-based cell reselection). The (information of) (or related to) satellite ephemeris may be used by the UE to evaluate CHO (or measurement report trigger) (e.g., location-based CHO/measurement report). The (information of) (or related to) satellite ephemeris may be used by the UE to derive cell reference location. The (information of) (or related to) satellite ephemeris may be used by the UE to derive distance between UE and a cell reference location.

The (information of) (or related to) cell reference location may be associated to a serving cell of the UE. The (information of) (or related to) cell reference location may be associated to a neighbor cell of the UE. The neighbor cell may belong to the same satellite as the serving cell. The neighbor cell may belong to a different satellite from the serving cell.

The (information of) (or related to) cell reference location may be used by the UE to evaluate cell (re)selection (e.g., location-based cell reselection). The (information of) (or related to) cell reference location may be used by the UE to evaluate CHO (or measurement report trigger) (e.g., location-based CHO/measurement report).

The (information of) common TA related parameter(s) may be configured by a network. The (information of) common TA related parameter(s) may be broadcasted in system information. A UE may acquire the (information of) common TA related parameter(s) by system information. The (information of) common TA related parameter(s) may include a network controlled common TA. The (information of) common TA related parameter(s) may contain information for deriving or calculating the common TA for UL transmission.

At least two or more of the following information could share the same validity duration:
  satellite ephemeris of a serving satellite (e.g., the satellite associated to a serving cell of the
  satellite ephemeris of a neighbor satellite (e.g., the satellite not associated to a serving cell of the UE);
  satellite ephemeris of a neighbor satellite (e.g., the satellite associated to a neighbor cell of the UE);
  cell reference location of a serving cell (e.g., PCell of the UE);
  cell reference location of a neighbor cell (e.g., the neighbor cell associated to the same satellite with the serving cell of the UE);
  cell reference location of a neighbor cell (e.g., the neighbor cell not associated to the same satellite with the serving cell of the UE);
  cell reference location of an earth fixed cell (e.g., a serving cell, a neighbor cell associated to the same satellite with the serving cell of the UE, and/or a neighbor cell not associated to the same satellite with the serving cell of the UE);
  cell reference location of a quasi-earth fixed cell (e.g., a serving cell, a neighbor cell associated to the same satellite with the serving cell of the UE, and/or a neighbor cell not associated to the same satellite with the serving cell of the UE);
  cell reference location of an earth moving cell (e.g., a serving cell, a neighbor cell associated to the same satellite with the serving cell of the UE, and/or a neighbor cell not associated to the same satellite with the serving cell of the UE);
  common TA related parameter(s), e.g., network controlled common TA.

The validity duration may be included in the same SIB as the satellite ephemeris. The validity duration may be included in the same SIB as the cell reference location. The validity duration may be included in the same SIB as the common TA related parameter(s).

The validity duration may be included in a different SIB from the satellite ephemeris. The validity duration may be included in a different SIB from the cell reference location. The validity duration may be included in a different SIB from the common TA related parameter(s).

At least one or more of the following information may not share the same validity duration:
  satellite ephemeris of a serving satellite (e.g., the satellite associated to a serving cell of the UE);
  satellite ephemeris of a neighbor satellite (e.g., the satellite not associated to a serving cell of the UE);
  satellite ephemeris of a neighbor satellite (e.g., the satellite associated to a neighbor cell of the UE);

cell reference location of a serving cell (e.g., PCell of the UE);

cell reference location of a neighbor cell (e.g., the neighbor cell associated to the same satellite with the serving cell of the UE);

cell reference location of a neighbor cell (e.g., the neighbor cell not associated to the same satellite with the serving cell of the UE);

cell reference location of an earth fixed cell (e.g., a serving cell, a neighbor cell associated to the same satellite with the serving cell of the UE, and/or a neighbor cell not associated to the same satellite with the serving cell of the UE);

cell reference location of a quasi-earth fixed cell (e.g., a serving cell, a neighbor cell associated to the same satellite with the serving cell of the UE, and/or a neighbor cell not associated to the same satellite with the serving cell of the UE);

cell reference location of an earth moving cell (e.g., a serving cell, a neighbor cell associated to the same satellite with the serving cell of the UE, and/or a neighbor cell not associated to the same satellite with the serving cell of the UE);

common TA related parameter(s), e.g., network controlled common TA.

For example, the same validity duration is shared by satellite ephemeris of a serving satellite and cell reference location of a serving cell, but not shared by cell reference location of a neighbor cell.

For example, the same validity duration is shared by satellite ephemeris of a serving satellite and satellite ephemeris of a neighbor satellite, but not shared by cell reference location (of a serving cell or a neighbor cell).

For example, the same validity duration is shared by satellite ephemeris (of a serving satellite) and cell reference location of a serving cell, but not shared by cell reference location of a neighbor cell (e.g., the neighbor cell not associated to the same satellite with the serving cell of the UE).

For example, the same validity duration is shared by satellite ephemeris and cell reference location of a quasi-earth fixed cell, but not shared by cell reference location of a earth moving cell.

Figure 8:
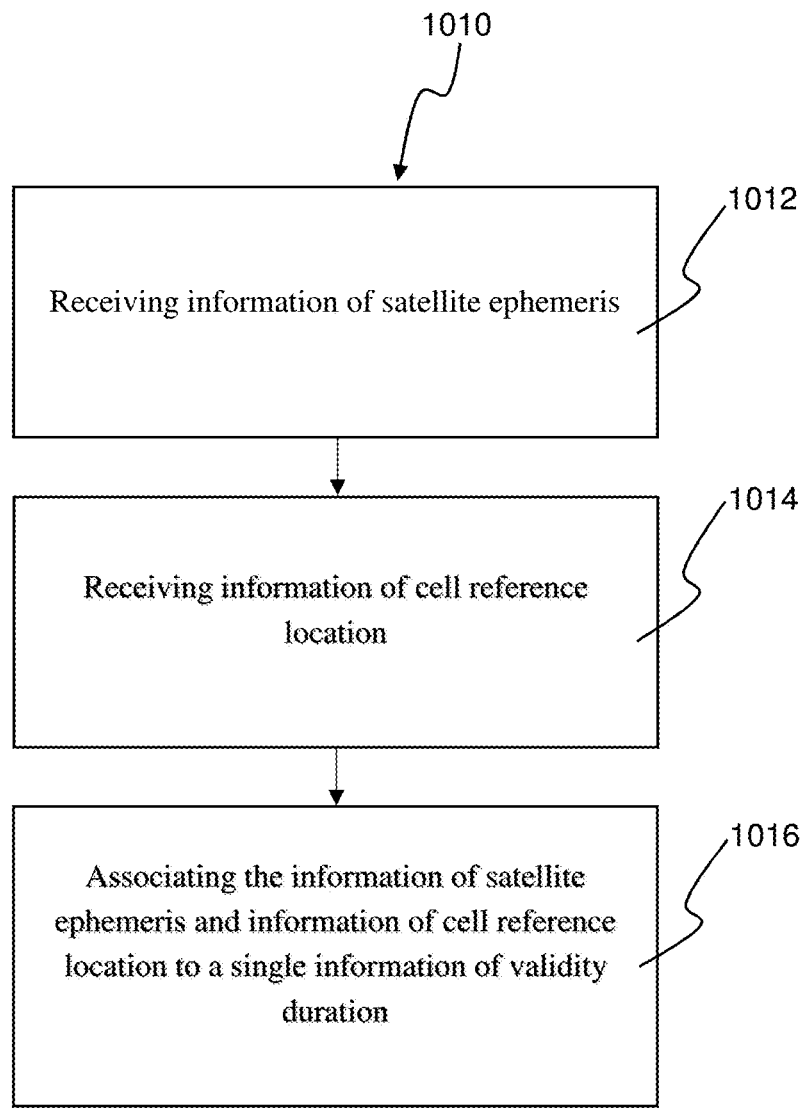
FIG. 8 is a flow diagram of a method of a UE receiving information of satellite ephemeris, in accordance with embodiments of the present invention.

Referring to FIG. 8, with this and other concepts, systems, and methods of the present invention, a method 1010 for a UE in a wireless communication system comprises receiving information of satellite ephemeris (step 1012), receiving information of cell reference location (step 1014), and associating the information of satellite ephemeris and information of cell reference location to a single information of validity duration (step 1016).

In various embodiments, the information of validity duration is broadcasted by system information.

In various embodiments, the information of validity duration is configured by a network.

In various embodiments, the information of satellite ephemeris is broadcasted by system information.

In various embodiments, the information of cell reference location is broadcasted by system information.

In various embodiments, the information of satellite ephemeris is associated to a serving satellite.

In various embodiments, the information of satellite ephemeris is associated to a neighbor satellite.

In various embodiments, the information of cell reference location is associated to a serving cell.

In various embodiments, the information of cell reference location is associated to a neighbor cell.

In various embodiments, the neighbor cell is associated to the same satellite with the serving cell.

In various embodiments, the neighbor cell is associated to a different satellite with the serving cell.

Referring back to FIGS. 3 and 4, in one or more embodiments from the perspective of a UE, the device 300 includes a program code 312 stored in memory 310 of the transmitter. The CPU 308 could execute program code 312 to: (i) receive information of satellite ephemeris, (ii) receive information of cell reference location, and (iii) associate the information of satellite ephemeris and information of cell reference location to a single information of validity duration. Moreover, the CPU 308 can execute the program code 312 to perform all of the described actions, steps, and methods described above, below, or otherwise herein.

Referring again back to FIGS. 3 and 4, in one or more embodiments from the perspective of a network, the device 300 includes a program code 312 stored in memory 310 of the transmitter. The CPU 308 could execute program code 312 to: (i) transmit information of satellite ephemeris, (ii) transmit information of cell reference location, and (iii) wherein the UE associates the information of satellite ephemeris and information of cell reference location to a single information of validity duration. Moreover, the CPU 308 can execute the program code 312 to perform all of the described actions, steps, and methods described above, below, or otherwise herein.

Figure 9:
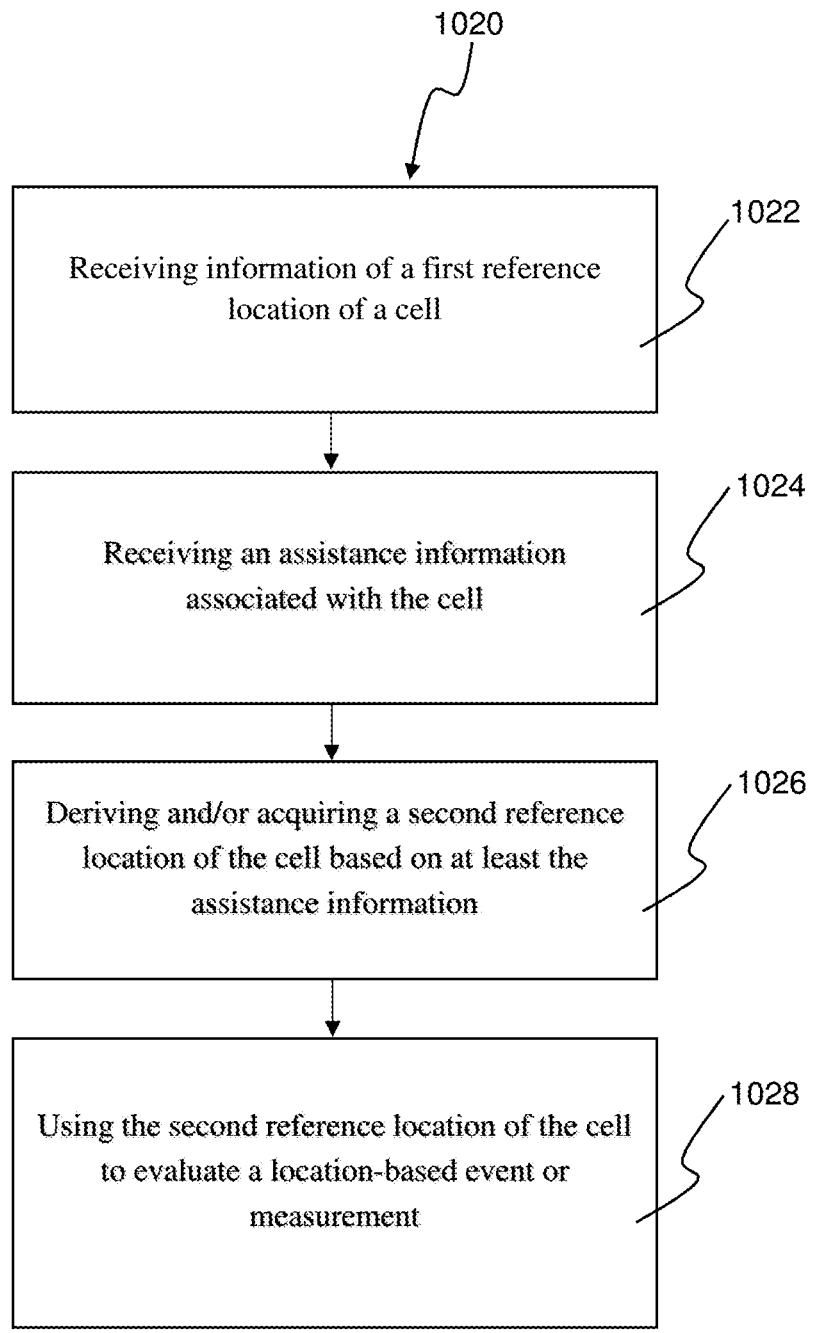
FIG. 9 is a flow diagram of a method of a UE receiving information of a first reference location of a cell, in accordance with embodiments of the present invention.

Referring to FIG. 9, with this and other concepts, systems, and methods of the present invention, a method 1020 for a UE in a wireless communication system comprises receiving information of a first reference location of a cell (step 1022), receiving an assistance information associated with the cell (step 1024), deriving and/or acquiring a second reference location of the cell based on at least the assistance information (step 1026), and using the second reference location of the cell to evaluate a location-based event or measurement (step 1028).

In various embodiments, the information of the first reference location and/or the assistance information is received in a first system information and/or a RRC message.

In various embodiments, the assistance information comprises at least one of time stamp, validity duration, direction, velocity, and/or ephemeris of the cell.

In various embodiments, the method further includes deriving the second reference location of the cell based on the first reference location of the cell.

In various embodiments, the method further includes acquiring the second reference location of the cell from a second system information.

In various embodiments, the method further includes deriving and/or acquiring the second reference location of the cell upon or before the first reference location of the cell becomes invalid.

In various embodiments, the method further includes considering the first reference location of the cell as invalid based on at least the assistance information.

In various embodiments, the location-based event or measurement is evaluated based on distance between the UE and the second reference location.

In various embodiments, the location-based event or measurement is used for triggering a conditional handover, a measurement report, and/or intra-frequency measurements.

In various embodiments, the cell is a serving cell, a neighbor cell, and/or a candidate cell.

Referring back to FIGS. 3 and 4, in one or more embodiments from the perspective of a UE, the device 300 includes a program code 312 stored in memory 310 of the transmitter. The CPU 308 could execute program code 312 to: (i) receive information of a first reference location of a cell, (ii) receive an assistance information associated with the cell, (iii) derive and/or acquire a second reference location of the cell based on at least the assistance information, and (iv) use the second reference location of the cell to evaluate a location-based event or measurement. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
receiving information of a first reference location of a cell;
receiving an assistance information associated with the cell;
deriving and/or acquiring a second reference location of the cell based on at least the assistance information; and
using the second reference location of the cell to evaluate a location-based event or measurement.

2. The method of claim 1, wherein the information of the first reference location and/or the assistance information is received in a first system information and/or a first Radio Resource Control (RRC) message.

3. The method of claim 1, wherein the assistance information comprises at least one of time stamp, validity duration, direction, velocity, and/or ephemeris of the cell.

4. The method of claim 1, further including deriving the second reference location of the cell based on the first reference location of the cell.

5. The method of claim 1, further including acquiring the second reference location of the cell from a second system information.

6. The method of claim 1, further including deriving and/or acquiring the second reference location of the cell upon or before the first reference location of the cell becomes invalid.

7. The method of claim 1, further including considering the first reference location of the cell as invalid based on at least the assistance information.

8. The method of claim 1, wherein the location-based event or measurement is evaluated based on distance between the UE and the second reference location.

9. The method of claim 1, wherein the location-based event or measurement is used for triggering a conditional handover, a measurement report, and/or intra-frequency measurement(s).

10. The method of claim 1, wherein the cell is a serving cell, a neighbor cell, and/or a candidate cell.

11. A User Equipment (UE), comprising:
a memory; and
a processor operatively connected to the memory, wherein the processor is configured to execute program code to:
receive information of a first reference location of a cell;
receive an assistance information associated with the cell;
derive and/or acquire a second reference location of the cell based on at least the assistance information; and
use the second reference location of the cell to evaluate a location-based event or measurement.

12. The UE of claim 11, wherein the information of the first reference location and/or the assistance information is received in a first system information and/or a first Radio Resource Control (RRC) message.

13. The UE of claim 11, wherein the assistance information comprises at least one of time stamp, validity duration, direction, velocity, and/or ephemeris of the cell.

14. The UE of claim 11, wherein the processor is further configured to execute program code to derive the second reference location of the cell based on the first reference location of the cell.

15. The UE of claim 11, wherein the processor is further configured to execute program code to acquire the second reference location of the cell from a second system information.

16. The UE of claim 11, wherein the processor is further configured to execute program code to derive and/or acquire the second reference location of the cell upon or before the first reference location of the cell becomes invalid.

17. The UE of claim 11, wherein the processor is further configured to execute program code to consider the first reference location of the cell as invalid based on at least the assistance information.

18. The UE of claim 11, wherein the location-based event or measurement is evaluated based on distance between the UE and the second reference location.

19. The UE of claim 11, wherein the location-based event or measurement is used for triggering a conditional handover, a measurement report, and/or intra-frequency measurement(s).

20. The UE of claim 11, wherein the cell is a serving cell, a neighbor cell, and/or a candidate cell.

* * * * *